US012283223B2

(12) United States Patent
Son et al.

(10) Patent No.: US 12,283,223 B2
(45) Date of Patent: Apr. 22, 2025

(54) GATE DRIVER AND DISPLAY DEVICE HAVING THE SAME

(71) Applicant: Samsung Display Co., Ltd., Yongin-Si (KR)

(72) Inventors: Sungmin Son, Yongin-si (KR); Jae-Jin Song, Yongin-si (KR); Kimyeong Eom, Yongin-si (KR); Jungwoo Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 68 days.

(21) Appl. No.: 18/125,135

(22) Filed: Mar. 23, 2023

(65) Prior Publication Data

US 2024/0062702 A1 Feb. 22, 2024

(30) Foreign Application Priority Data

Aug. 16, 2022 (KR) ........................ 10-2022-0102111

(51) Int. Cl.
*G09G 3/32* (2016.01)

(52) U.S. Cl.
CPC ....... *G09G 3/32* (2013.01); *G09G 2300/0426* (2013.01); *G09G 2300/0842* (2013.01); *G09G 2310/0267* (2013.01); *G09G 2310/0275* (2013.01); *G09G 2310/08* (2013.01)

(58) Field of Classification Search
CPC ...... G09G 3/2077; G09G 3/32; G09G 3/3233; G09G 3/3266; G09G 2300/0426; G09G 2300/0819; G09G 2300/0842; G09G 2300/0852; G09G 2300/0861; G09G 2310/0251; G09G 2310/0267; G09G 2310/0275; G09G 2310/0286; G09G 2310/061; G09G 2310/08; G09G 2320/0219; G09G 2340/0435
See application file for complete search history.

(56) References Cited

U.S. PATENT DOCUMENTS

| | | | | |
|---|---|---|---|---|
| 9,311,849 | B2 * | 4/2016 | Qian | H03K 3/012 |
| 10,453,386 | B2 | 10/2019 | Jang | |
| 2013/0069854 | A1 | 3/2013 | Park et al. | |
| 2013/0222352 | A1 | 8/2013 | Jeong | |
| 2021/0193020 | A1 | 6/2021 | Ka et al. | |
| 2022/0148511 | A1 | 5/2022 | Kim et al. | |

* cited by examiner

*Primary Examiner* — Nelson M Rosario
(74) *Attorney, Agent, or Firm* — Innovation Counsel LLP

(57) ABSTRACT

Provided is a gate driver comprising an inverter inverting a start signal to generate an inverted start signal, a first driver including a first stage generating a bias gate signal to initialize a light emitting element of each of pixels in response to the inverted start signal, and a second driver including a second stage generating a write gate signal to apply data voltages to the pixels in response to the start signal. Accordingly, the gate driver may generate a plurality of gate signals using one start signal. In addition, since the gate driver generates a write gate signal and a bias gate signal using one start signal, a bias operation and a light emitting element initialization operation may be performed in a self-scan period without adding the start signal. Further, a size of the gate driver may be reduced, and accordingly, the gate driver may be efficiently disposed.

20 Claims, 12 Drawing Sheets

GATE DRIVER AND DISPLAY DEVICE HAVING THE SAME

CROSS REFERENCE TO RELATED APPLICATION

This application claims priority under 35 U.S.C. § 119 to Korean Patent Application No. 10-2022-0102111, filed on Aug. 16, 2022 in the Korean Intellectual Property Office (KIPO), the contents of which are herein incorporated by reference in their entireties.

BACKGROUND

1. Field

The present disclosure relates to a gate driver and a display device including the gate driver. More particularly, the present disclosure relates to a gate driver including a plurality of stages and a display device including the gate driver.

2. Description of the Related Art

Generally, a display device may include a display panel, a timing controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The timing controller may control the gate driver and the data driver.

The display device may display an image at a constant driving frequency of 60 Hz or higher. However, a rendering frequency of rendering by a host processor (e.g., a graphic processing unit; GPU) that provides input image data to the display device may not match a driving frequency of the display device, and a tearing phenomenon in which a boundary line is recognized in the image displayed on the display device may occur due to frequency mismatch.

To prevent such the tearing phenomenon, a variable frame mode for synchronizing the rendering frequency of the host processor and the driving frequency of the display device may be developed.

SUMMARY

The present disclosure provides a gate driver and a display device including the same that prevents an image copy caused by a region in which a grayscale level of input image data changes rapidly.

The present disclosure also provides a method of driving the display device.

According to embodiments of the present disclosure, a gate driver of a display device may include an inverter configured to invert a start signal to generate an inverted start signal, a first driver including a first stage configured to generate a bias gate signal to initialize a light emitting element of each of pixels in the display device in response to the inverted start signal, and a second driver including a second stage configured to generate a write gate signal to apply data voltages to the pixels in the display device in response to the start signal.

In an embodiment, the write gate signal may have an activation period in a display scan period in which the data voltages are written to a storage capacitor of each of the pixels in the display device and a self-scan period in which the data voltages are not written to the storage capacitor of each of the pixels in the display device.

In an embodiment, the bias gate signal may have an activation period in a display scan period in which the data voltages are written to a storage capacitor of each of the pixels in the display device and a self-scan period in which the data voltages are not written to the storage capacitor of each of the pixels in the display device.

In an embodiment, the inverter may be configured to receive a first clock signal and a second clock signal to invert the start signal, and the first stage may be configured to receive the first clock signal and the second clock signal to generate the bias gate signal.

In an embodiment, the second stage may be configured to receive a third clock signal and a fourth clock signal to generate the write gate signal.

In an embodiment, each of the pixels in the display device may include a first pixel transistor including a control electrode connected to a first pixel node, a first electrode connected to a second pixel node, and a second electrode connected to a third pixel node, a second pixel transistor including a control electrode configured to receive the write gate signal, a first electrode configured to receive the data voltages, and a second electrode connected to the second pixel node, a third pixel transistor including a control electrode configured to receive a compensation gate signal, a first electrode connected to the third pixel node, and a second electrode connected to the first pixel node, a fourth pixel transistor including a control electrode configured to receive an initialization gate signal, a first electrode configured to receive a first initialization voltage, and a second electrode connected to the first pixel node, a fifth pixel transistor including a control electrode configured to receive an emission signal, a first electrode configured to receive a first power voltage, and a second electrode connected to the second pixel node, a sixth pixel transistor including a control electrode configured to receive the emission signal, a first electrode connected to the third pixel node, and a second electrode connected to a fourth pixel node, a seventh pixel transistor including a control electrode configured to receive the bias gate signal, a first electrode configured to receive a second initialization voltage, and a second electrode connected to the fourth pixel node, a storage capacitor including a first electrode configured to receive the first power voltage and a second electrode connected to the first pixel node, and the light emitting element including a first electrode connected to the fourth pixel node and a second electrode configured to receive a second power voltage.

In an embodiment, the first stage may include a 1-1th stage transistor including a control electrode configured to receive a first clock signal, a first electrode configured to receive a first input signal, and a second electrode connected to a 1-1th stage node, a 1-2th stage transistor including a control electrode connected to a 1-2th stage node, a first electrode configured to receive a high voltage, and a second electrode connected to a 1-3th stage node, a 1-3th stage transistor including a control electrode connected to a 1-4th stage node, a first electrode configured to receive a second clock signal, and a second electrode connected to the 1-3th stage node, a 1-4th stage transistor including a control electrode connected to the 1-1th stage node, a first electrode configured to receive the first clock signal, and a second electrode connected to the 1-2th stage node, a 1-5th stage transistor including a control electrode configured to receive the first clock signal, a first electrode configured to receive a low voltage, and a second electrode connected to the 1-2th stage node, a 1-6th stage transistor including a control electrode configured to receive the second clock signal, a first electrode connected to a 1-5th stage node, and a second electrode connected to a 1-6th stage node, a 1-7th stage transistor including a control electrode connected to a 1-7th stage node, a first electrode configured to receive the second clock signal, and a second electrode connected to the 1-5th stage node, a 1-8th stage transistor including a control electrode connected to the 1-1th stage node, a first electrode configured to receive the high voltage, and a second electrode connected to the 1-6th stage node, a 1-9th stage transistor including a control electrode connected to the 1-6th stage node, a first electrode configured to receive the high voltage, and a second electrode connected to an output terminal of the first stage, a 1-10th stage transistor including a control electrode connected to the 1-4th stage node, a first electrode configured to receive the low voltage, and a second electrode connected to the output terminal of the first stage, a 1-11th stage transistor including a control electrode configured to receive the low voltage, a first electrode connected to the 1-2th stage node, and a second electrode connected to the 1-7th stage node, a 1-12th stage transistor including a control electrode configured to receive the low voltage, a first electrode connected to the 1-1th stage node, and a second electrode connected to the 1-4th stage node; a 1-1th stage capacitor including a first electrode configured to receive the high voltage and a second electrode connected to the 1-6th stage node, a 1-2th stage capacitor including a first electrode connected to the 1-7th stage node and a second electrode connected to the 1-5th stage node, and a 1-3th stage capacitor including a first electrode connected to the 1-4th stage node and a second electrode connected to the 1-3th stage node.

In an embodiment, the first stage first outputting the bias gate signal in one frame may be configured to receive the inverted start signal as the first input signal.

In an embodiment, wherein the second stage may include a 2-1th stage transistor including a control electrode configured to receive a third clock signal, a first electrode configured to receive a second input signal, and a second electrode connected to a 2-1th stage node, a 2-2th stage transistor including a control electrode connected to a 2-2th stage node, a first electrode configured to receive a high voltage, and a second electrode connected to a first electrode of a 2-3th stage transistor, the 2-3th stage transistor including a control electrode configured to receive a fourth clock signal, the first electrode connected to the second electrode of the 2-2th stage transistor, and a second electrode connected to the 2-1th stage node, a 2-4th stage transistor including a control electrode connected to the 2-1th stage node, a first electrode configured to receive the third clock signal, and a second electrode connected to the 2-2th stage node, a 2-5th stage transistor including a control electrode configured to receive the third clock signal, a first electrode configured to receive a low voltage, and a second electrode connected to the 2-2th stage node, a 2-6th stage transistor including a control electrode connected to the 2-2th stage node, a first electrode configured to receive the high voltage, and a second electrode connected to an output terminal of the second stage, a 2-7th stage transistor including a control electrode connected to a 2-3th stage node, a first electrode configured to receive the fourth clock signal, and a second electrode connected to the output terminal of the second stage, a 2-8th stage transistor including a control electrode configured to receive the low voltage, a first electrode connected to the 2-1th stage node, and a second electrode connected to the 2-3th stage node, a 2-1th stage capacitor including a first electrode configured to receive the high voltage and a second electrode connected to the 2-2th stage node, and a 2-2th stage capacitor including a first electrode connected to the 2-3th stage node and a second electrode connected to the output terminal of the second stage.

In an embodiment, the second stage first outputting the write gate signal in one frame may be configured to receive the start signal as the second input signal.

In an embodiment, the inverter may include a first inverter transistor including a control electrode configured to receive the start signal, a first electrode configured to receive a first clock signal, and a second electrode connected to a first inverter node, a second inverter transistor including a control electrode configured to receive the first clock signal, a first electrode configured to receive a low voltage, and a second electrode connected to the first inverter node, a third inverter transistor including a control electrode configured to receive a second clock signal, a first electrode connected to a second inverter node, and a second electrode connected to an output terminal of the inverter, a fourth inverter transistor including a control electrode connected to a third inverter node, a first electrode configured to receive the second clock signal, and a second electrode connected to the second inverter node, a fifth inverter transistor including a control electrode configured to receive the start signal, a first electrode configured to receive a high voltage, and a second electrode connected to the output terminal of the inverter, a sixth inverter transistor including a control electrode configured to receive the low voltage, a first electrode connected to the first inverter node, and a second electrode connected to the third inverter node, a first inverter capacitor including a first electrode configured to receive the high voltage and a second electrode connected to the output terminal of the inverter; and a second inverter capacitor including a first electrode connected to the third inverter node and a second electrode connected to the second inverter node.

According to embodiments of the present disclosure, a display device may include a display panel including pixels, a data driver configured to apply data voltages to the pixels, a gate driver configured to apply a bias gate signal to each of the pixels to initialize a light emitting element of each of the pixels and a write gate signal to each of the pixels to apply the data voltages to the pixels, and a timing controller configured to control the data driver and the gate driver, and the gate driver may include an inverter configured to invert a start signal to generate an inverted start signal, a first driver including a first stage configured to generate the bias gate signal in response to the inverted start signal, and a second driver including a second stage configured to generate the write gate signal in response to the start signal.

In an embodiment, the write gate signal may have an activation period in a display scan period in which the data voltages are written to a storage capacitor of each of the pixels and a self-scan period in which the data voltages are not written to the storage capacitor of each of the pixels.

In an embodiment, the bias gate signal may have an activation period in a display scan period in which the data voltages are written to a storage capacitor of each of the pixels and a self-scan period in which the data voltages are not written to the storage capacitor of each of the pixels.

In an embodiment, the inverter may be configured to receive a first clock signal and a second clock signal to invert the start signal, and the first stage may be configured to receive the first clock signal and the second clock signal to generate the bias gate signal.

In an embodiment, the second stage may be configured to receive a third clock signal and a fourth clock signal to generate the write gate signal.

In an embodiment, each of the pixels may include a first pixel transistor including a control electrode connected to a first pixel node, a first electrode connected to a second pixel node, and a second electrode connected to a third pixel node, a second pixel transistor including a control electrode configured to receive the write gate signal, a first electrode configured to receive the data voltages, and a second electrode connected to the second pixel node, a third pixel transistor including a control electrode configured to receive a compensation gate signal, a first electrode connected to the third pixel node, and a second electrode connected to the first pixel node, a fourth pixel transistor including a control electrode configured to receive an initialization gate signal, a first electrode configured to receive a first initialization voltage, and a second electrode connected to the first pixel node, a fifth pixel transistor including a control electrode configured to receive an emission signal, a first electrode configured to receive a first power voltage, and a second electrode connected to the second pixel node, a sixth pixel transistor including a control electrode configured to receive the emission signal, a first electrode connected to the third pixel node, and a second electrode connected to a fourth pixel node, a seventh pixel transistor including a control electrode configured to receive the bias gate signal, a first electrode configured to receive a second initialization voltage, and a second electrode connected to the fourth pixel node, a storage capacitor including a first electrode configured to receive the first power voltage and a second electrode connected to the first pixel node, and the light emitting element including a first electrode connected to the fourth pixel node and a second electrode configured to receive a second power voltage.

In an embodiment, the first stage may include a 1-1th stage transistor including a control electrode configured to receive a first clock signal, a first electrode configured to receive a first input signal, and a second electrode connected to a 1-1th stage node, a 1-2th stage transistor including a control electrode connected to a 1-2th stage node, a first electrode configured to receive a high voltage, and a second electrode connected to a 1-3th stage node, a 1-3th stage transistor including a control electrode connected to a 1-4th stage node, a first electrode configured to receive a second clock signal, and a second electrode connected to the 1-3th stage node, a 1-4th stage transistor including a control electrode connected to the 1-1th stage node, a first electrode configured to receive the first clock signal, and a second electrode connected to the 1-2th stage node, a 1-5th stage transistor including a control electrode configured to receive the first clock signal, a first electrode configured to receive a low voltage, and a second electrode connected to the 1-2th stage node, a 1-6th stage transistor including a control electrode configured to receive the second clock signal, a first electrode connected to a 1-5th stage node, and a second electrode connected to a 1-6th stage node, a 1-7th stage transistor including a control electrode connected to a 1-7th stage node, a first electrode configured to receive the second clock signal, and a second electrode connected to the 1-5th stage node, a 1-8th stage transistor including a control electrode connected to the 1-1th stage node, a first electrode configured to receive the high voltage, and a second electrode connected to the 1-6th stage node, a 1-9th stage transistor including a control electrode connected to the 1-6th stage node, a first electrode configured to receive the high voltage, and a second electrode connected to an output terminal of the first stage, a 1-10th stage transistor including a control electrode connected to the 1-4th stage node, a first electrode configured to receive the low voltage, and a second electrode connected to the output terminal of the first stage, a 1-11th stage transistor including a control electrode configured to receive the low voltage, a first electrode connected to the 1-2th stage node, and a second electrode connected to the 1-7th stage node, a 1-12th stage transistor including a control electrode configured to receive the low voltage, a first electrode connected to the 1-1th stage node, and a second electrode connected to the 1-4th stage node, a 1-1th stage capacitor including a first electrode configured to receive the high voltage and a second electrode connected to the 1-6th stage node, a 1-2th stage capacitor including a first electrode connected to the 1-7th stage node and a second electrode connected to the 1-5th stage node, and a 1-3th stage capacitor including a first electrode connected to the 1-4th stage node and a second electrode connected to the 1-3th stage node.

In an embodiment, the second stage may include a 2-1th stage transistor including a control electrode configured to receive a third clock signal, a first electrode configured to receive a second input signal, and a second electrode connected to a 2-1th stage node, a 2-2th stage transistor including a control electrode connected to a 2-2th stage node, a first electrode configured to receive a high voltage, and a second electrode connected to a first electrode of a 2-3th stage transistor, the 2-3th stage transistor including a control electrode configured to receive a fourth clock signal, the first electrode connected to the second electrode of the 2-2th stage transistor, and a second electrode connected to the 2-1th stage node, a 2-4th stage transistor including a control electrode connected to the 2-1th stage node, a first electrode configured to receive the third clock signal, and a second electrode connected to the 2-2th stage node, a 2-5th stage transistor including a control electrode configured to receive the third clock signal, a first electrode configured to receive a low voltage, and a second electrode connected to the 2-2th stage node, a 2-6th stage transistor including a control electrode connected to the 2-2th stage node, a first electrode configured to receive the high voltage, and a second electrode connected to an output terminal of the second stage, a 2-7th stage transistor including a control electrode connected to a 2-3th stage node, a first electrode configured to receive the fourth clock signal, and a second electrode connected to the output terminal of the second stage, a 2-8th stage transistor including a control electrode configured to receive the low voltage, a first electrode connected to the 2-1th stage node, and a second electrode connected to the 2-3th stage node, a 2-1th stage capacitor including a first electrode configured to receive the high voltage and a second electrode connected to the 2-2th stage node, and a 2-2th stage capacitor including a first electrode connected to the 2-3th stage node and a second electrode connected to the output terminal of the second stage.

In an embodiment, the inverter may include a first inverter transistor including a control electrode configured to receive the start signal, a first electrode configured to receive a first clock signal, and a second electrode connected to a first inverter node, a second inverter transistor including a control electrode configured to receive the first clock signal, a first electrode configured to receive a low voltage, and a second electrode connected to the first inverter node, a third inverter transistor including a control electrode configured to receive a second clock signal, a first electrode connected to a second inverter node, and a second electrode connected to an output terminal of the inverter, a fourth inverter transistor including a control electrode connected to a third inverter node, a first electrode configured to receive the second clock signal, and a second electrode connected to the second inverter node, a fifth inverter transistor including a control electrode configured to receive the start signal, a first electrode configured to receive a high voltage, and a second electrode connected to the output terminal of the inverter, a first inverter capacitor including a first electrode configured to receive the high voltage and a second electrode connected to the output terminal of the inverter, a sixth inverter transistor including a control electrode configured to receive the low voltage, a first electrode connected to the first inverter node, and a second electrode connected to the third inverter node, and a second inverter capacitor including a first electrode connected to the third inverter node and a second electrode connected to the second inverter node.

Therefore, the gate driver may generate a plurality of gate signals using one start signal by including an inverter inverting the start signal to generate an inverted start signal, a first driver including a first stage generating a bias gate signal to initialize a light emitting element of each of pixels in response to the inverted start signal, and a second driver including a second stage generating a write gate signal to apply data voltages to the pixels in response to the start signal.

In addition, a size of the gate driver may be reduced. Accordingly, the gate driver may be efficiently disposed.

However, the effects of the present disclosure are not limited to the above-described effects, and may be variously expanded without departing from the spirit and scope of the present disclosure.

DETAILED DESCRIPTION OF THE DISCLOSURE

Hereinafter, the present disclosure will be explained in detail with reference to the accompanying drawings.

Figure 1:
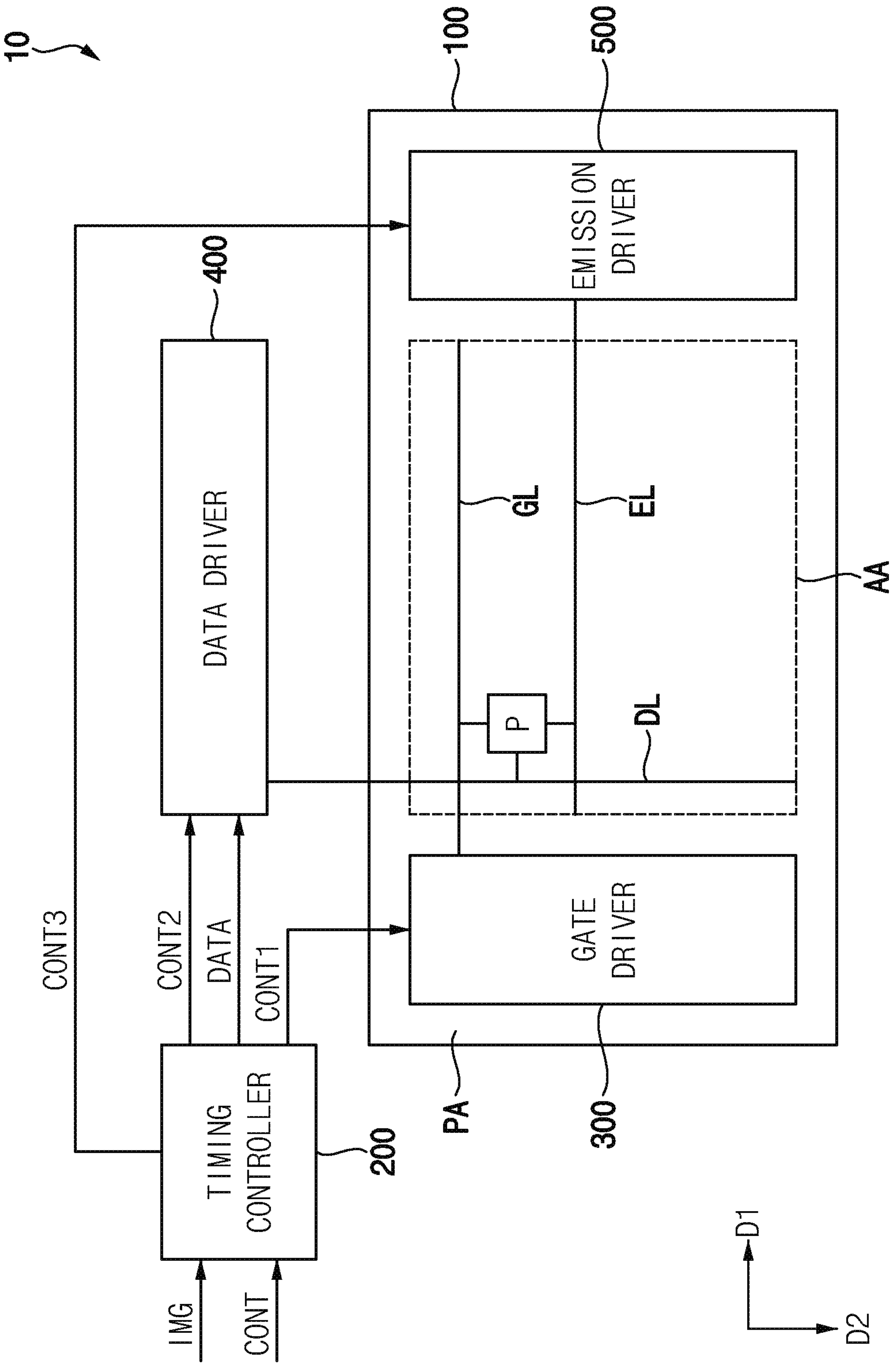
FIG. 1 is a block diagram illustrating a display device according to embodiments of the present disclosure.

FIG. 1 is a block diagram illustrating a display device according to embodiments of the present disclosure.

Referring to FIG. 1, the display device 10 may include a display panel 100, a timing controller 200, a gate driver 300, a data driver 400, and an emission driver 500. In an embodiment, the timing controller 200 and the data driver 400 may be integrated into one chip.

The display panel 100 has a display region AA in which an image is displayed and a peripheral region PA adjacent to the display region AA. In an embodiment, the gate driver 300 and the emission driver 500 may be mounted in the peripheral region PA of the display panel 100.

The display panel 100 may include a plurality of gate lines GL, a plurality of data lines DL, a plurality of emission lines EL, and a plurality of pixels P electrically connected to the data lines DL, the gate lines GL, and the emission lines EL. The gate lines GL and the emission lines EL may extend in a first direction D1 and the data lines DL may extend in a second direction D2 crossing the first direction D1.

The timing controller 200 may receive input image data IMG and an input control signal CONT from a host processor (e.g., a graphic processing unit; GPU). For example, the input image data IMG may include red image data, green image data and blue image data. In an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, a third control signal CONT3, and data signal DATA based on the input image data IMG and the input control signal CONT.

The timing controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The timing controller 200 may generate the third control signal CONT3 for controlling operation of the emission driver 500 based on the input control signal CONT and output the third control signal CONT3 to the emission driver 500. The third control signal CONT3 may include a vertical start signal and an emission clock signal.

The timing controller 200 may receive the input image data IMG and the input control signal CONT, and generate the data signal DATA. The timing controller 200 may output the data signal DATA to the data driver 400.

The gate driver 300 may generate gate signals for driving the gate lines GL in response to the first control signal CONT1 input from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may convert the data signal DATA into data voltages having an analog type. The data driver 400 may output the data voltage to the data lines DL.

The emission driver 500 may generate emission signals for driving the emission lines EL in response to the third control signal CONT3 input from the timing controller 200. The emission driver 500 may output the emission signals to the emission lines EL. For example, the emission driver 500 may sequentially output the emission signals to the emission lines EL.

Figure 2:
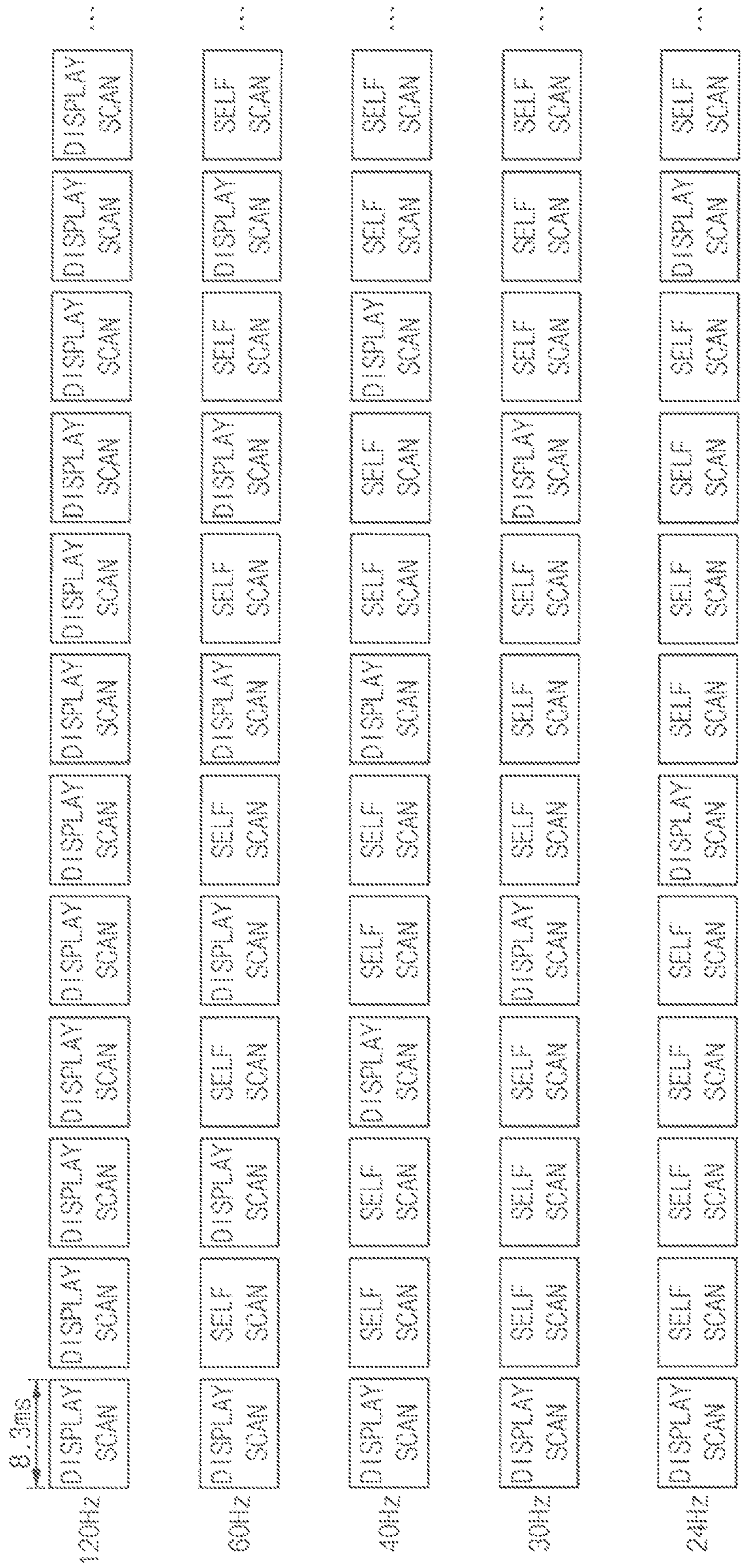
FIG. 2 is a conceptual diagram for explaining a driving operation of the display device of FIG. 1.

FIG. 2 is a conceptual diagram for explaining a driving operation of the display device of FIG. 1.

Referring to FIG. 2, the timing controller 200 may vary a driving frequency of the display panel 100 by adjusting the number of self-scan periods. The display device 10 may write the data voltages to a storage capacitor (CST in FIG. 3) of each of the pixels P in a display scan period and may perform only light emission without writing the data voltages to the storage capacitor (CST in FIG. 3) of each of the pixels P in the self-scan period.

In an embodiment, it is assumed that each of one display scan period (DISPLAY SCAN) and one self-scan period (SELF SCAN) is 8.3 ms respectively, and the maximum driving frequency of the display panel 100 is 120 Hz. The display device 10 may include at least one self-scan period between the display scan periods at driving frequencies (i.e., 60 Hz, 40 Hz, 30 Hz, and 24 Hz) except for the maximum driving frequency of the display panel 100. Specifically, when the driving frequency of the display panel 100 is 120 Hz, the display device 10 may not include the self-scan period between the display scan periods. When the driving frequency of the display panel 100 is 60 Hz, the display device 10 may include one self-scan period between the two adjacent display scan periods. When the driving frequency of the display panel 100 is 40 Hz, the display device 10 may include two self-scan periods between the two adjacent display scan periods. When the driving frequency of the display panel 100 is 30 Hz, the display device 10 may include three self-scan periods between the two adjacent display scan periods. When the driving frequency of the display panel 100 is 24 Hz, the display device 10 may include four self-scan periods between the two adjacent display scan periods. Since the data voltages is not written to the pixels P in the self-scan period, the display device 10 may adjust the driving frequency of the display panel 100 by adjusting the number of the self-scan periods. That is, since the interval between the display scan periods in which data voltages are written increases as the number of self-scan periods increases, the driving frequency of the display panel 100 may be varied.

Figure 3:
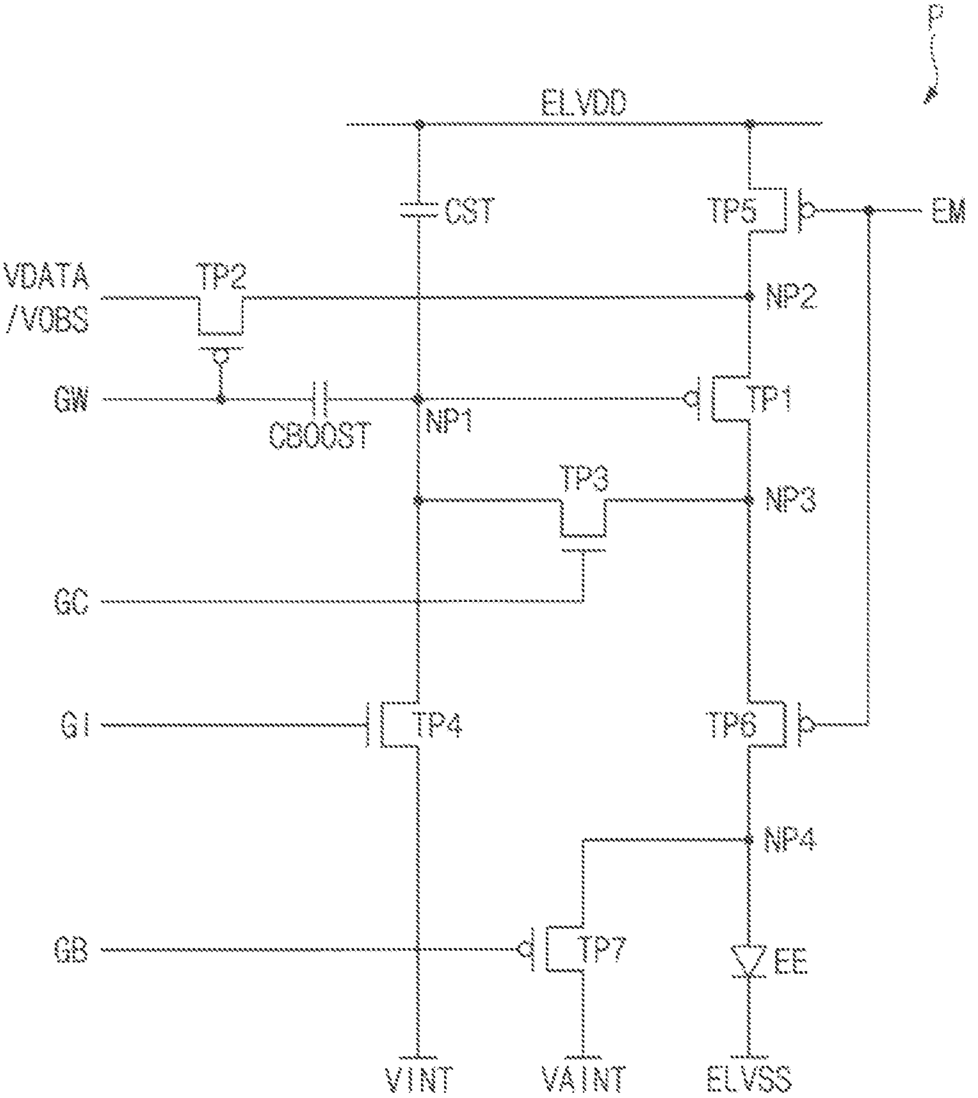
FIG. 3 is a circuit diagram illustrating an example of pixels of the display device of FIG. 1.

FIG. 3 is a circuit diagram illustrating an example of the pixels P of the display device of FIG. 1.

Referring to FIG. 3, each of the pixels P may include a first pixel transistor TP1 (i.e., a driving transistor) including a control electrode connected to a first pixel node NP1, a first electrode connected to a second pixel node NP2, and a second electrode connected to a third pixel node NP3, a second pixel transistor TP2 including a control electrode receiving the write gate signal GW, a first electrode receiving the data voltage VDATA and a bias voltage VOBS, and a second electrode connected to the second pixel node NP2, a third pixel transistor TP3 including a control electrode receiving a compensation gate signal GC, a first electrode connected to the third pixel node NP3, and a second electrode connected to the first pixel node NP1, a fourth pixel transistor TP4 including a control electrode receiving an initialization gate signal GI, a first electrode receiving a first initialization voltage VINT, and a second electrode connected to the first pixel node NP1, a fifth pixel transistor TP5 including a control electrode receiving the emission signal EM, a first electrode receiving a first power voltage ELVDD (e.g., a high power voltage), and a second electrode connected to the second pixel node NP2, a sixth pixel transistor TP6 including a control electrode receiving the emission signal EM, a first electrode connected to the third pixel node NP3, and a second electrode connected to a fourth pixel node NP4, a seventh pixel transistor TP7 including a control electrode receiving a bias gate signal GB, a first electrode receiving an second initialization voltage VAINT, and a second electrode connected to the fourth pixel node NP4, the storage capacitor CST including a first electrode receiving the first power voltage ELVDD and a second electrode connected to the first pixel node NP1, and a light emitting element EE including a first electrode connected to the fourth pixel node NP4 and a second electrode receiving a second power voltage ELVSS (e.g., a low power voltage). In some embodiments, each of the pixels P may further include a boost capacitor CBOOST having a first electrode receiving the write gate signal GW and a second electrode connected to the first pixel node NP1.

The first, second, and fifth to seventh pixel transistors TP1, TP2, TP5, TP6, and TP7 may be implemented as p-channel metal oxide semiconductor (PMOS) transistors. In this case, a low voltage level may be an activation level, and a high voltage level may be an inactivation level. For example, when a signal applied to a control electrode of the PMOS transistor has the low voltage level, the PMOS transistor may be turned on. For example, when a signal applied to the control electrode of the PMOS transistor has the high voltage level, the PMOS transistor may be turned off.

The third and fourth pixel transistors TP3 and TP4 may be implemented as n-channel metal oxide semiconductor (NMOS) transistors. In this case, the low voltage level may be a inactivation level, and the high voltage level may be an activation level. For example, when a signal applied to a control electrode of the NMOS transistor has the low voltage level, the NMOS transistor may be turned off. For example, when a signal applied to the control electrode of the NMOS transistor has the high voltage level, the NMOS transistor may be turned on.

However, the present disclosure is not limited thereto. For example, the first, second, and fifth to seventh pixel transistors TP1, TP2, TP5, TP6, and TP7 may be NMOS transistors. For example, the third and fourth pixel transistors TP3 and TP4 may be PMOS transistors.

For example, in an initialization period, the initialization gate signal GI may have the activation level, and the fourth pixel transistor TP4 may be turned on. Accordingly, the first initialization voltage VINT may be applied to the control electrode (i.e., the first pixel node NP1) of the driving transistor TP1 (i.e., a gate initialization operation). That is, the control electrode of the driving transistor TP1 (i.e., the data voltage VDATA written to the storage capacitor CST) may be initialized.

For example, in a data writing period, the write gate signal GW and the compensation gate signal GC may have the activation level, and the second pixel transistor TP2 and the third pixel transistor TP3 may be turned on. Accordingly, the data voltage VDATA may be written to the storage capacitor CST (i.e., a data write operation).

For example, in a bias period, the write gate signal GW may have the activation level, and the second pixel transistor TP2 may be turned on. Further, in the bias period, the compensation gate signal GC may have the inactivation level, and the third pixel transistor TP3 may be turned off. Accordingly, the bias voltage VOBS may be applied to the first electrode of the driving transistor TP1 (i.e., a bias operation). That is, a bias of the driving transistor TP1 may be on-bias.

For example, in a light emitting element initialization period, the bias gate signal GB may have the activation level, and the seventh pixel transistor TP7 may be turned on. Accordingly, the second initialization voltage VATIN may be applied to the first electrode (i.e., an anode electrode) of the light emitting element EE (i.e., a light emitting element initialization operation). That is, the anode electrode of the light emitting element EE may be initialized.

For example, in an emission period, the emission signal EM may have the activation level, and the fifth pixel transistor TP5 and the sixth pixel transistor TP6 may be turned on. Accordingly, the first power voltage ELVDD may be applied to the driving transistor TP1 to generate a driving current, and a driving current may be applied to the light emitting element EE (i.e., a light emitting operation). That is, the light emitting element EE may emit light with a luminance corresponding to the driving current.

Figure 4:
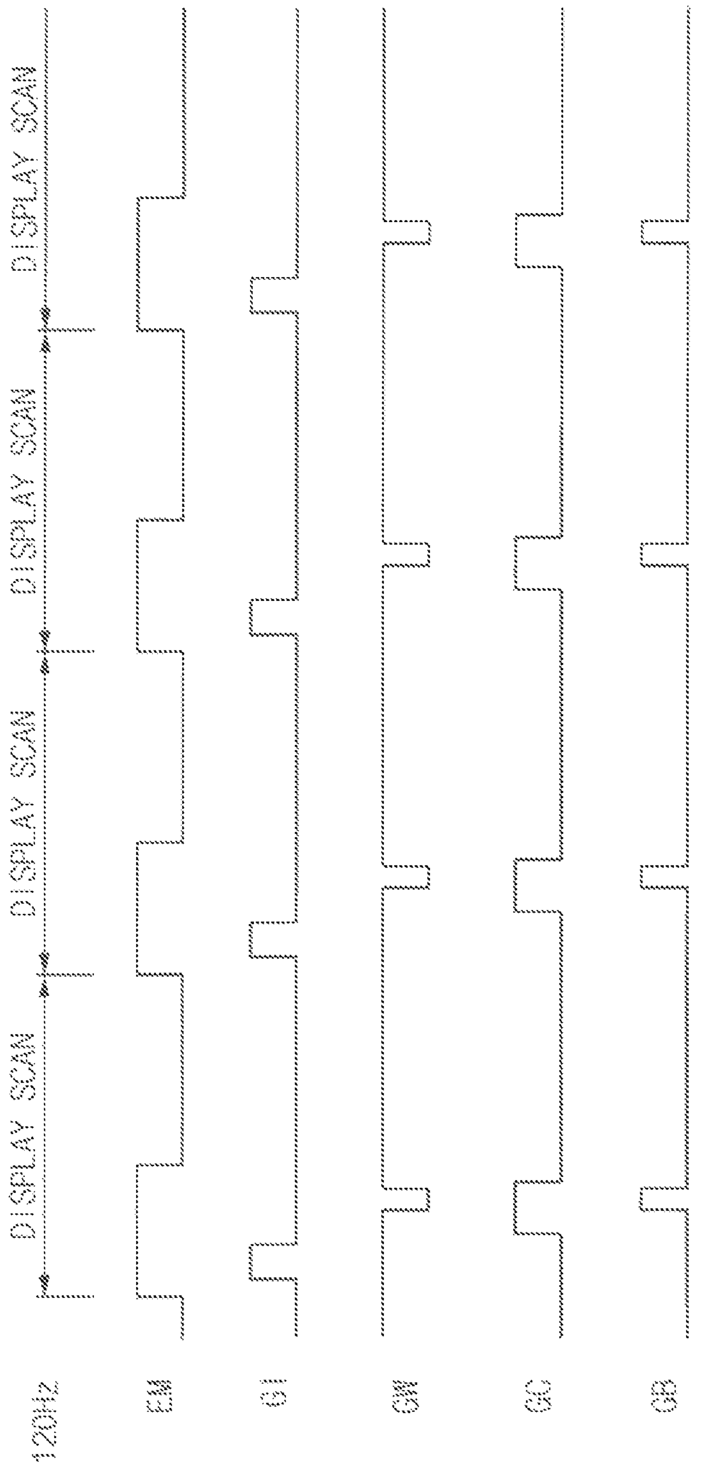
FIG. 4 is a timing diagram illustrating an example in which the display device of FIG. 1 operates at a maximum driving frequency.
Figure 5:
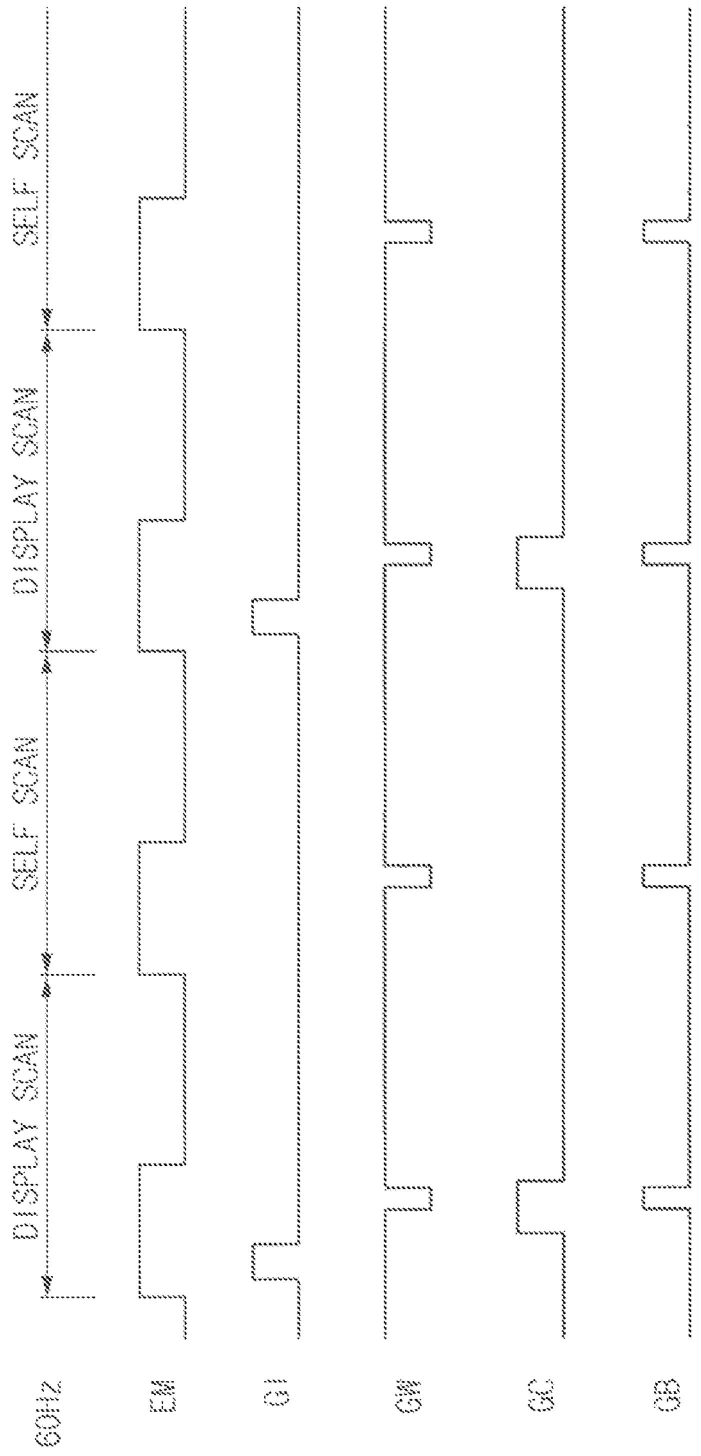
FIG. 5 is a timing diagram illustrating an example in which the display device of FIG. 1 operates at a driving frequency other than a maximum driving frequency.

FIG. 4 is a timing diagram illustrating an example in which the display device of FIG. 1 operates at a maximum driving frequency, and FIG. 5 is a timing diagram illustrating an example in which the display device of FIG. 1 operates at a driving frequency other than the maximum driving frequency. FIGS. 4 and 5 shows the maximum driving frequency as 120 Hz.

Referring to FIGS. 2, 3, 4, and 5, the write gate signal GW may have the activation period in the display scan period in which the data voltages VDATA are written to the storage capacitor CST of each of the pixels P and the self-scan period in which the data voltages VDATA are not written to the storage capacitor CST of each of the pixels P. The bias gate signal GB may have the activation period in the display scan period in which the data voltages VDATA are written to the storage capacitor CST of each of the pixels P and the self-scan period in which the data voltages VDATA are not written to the storage capacitor CST of each of the pixels P. Here, the activation period may be a period having the activation level, and as described above, the activation level may be different depending on a type of a transistor to which each signal is applied.

For example, the display scan period may include the initialization period (i.e., the activation period of the initialization gate signal GI), the data writing period (i.e., the activation period of the write gate signal GW), the light emitting element initialization period (i.e., the activation period of the bias gate signal GB), and the emission period (i.e., the activation period of the emission signal EM).

For example, the self-scan period may include the light emitting element initialization period, the bias period (i.e., the activation period of the write gate signal GW), and the emission period. For example, in the bias period, the compensation gate signal GC may have the inactivation level, unlike the data writing period. FIGS. 4 and 5 show that the bias period is not included in the display scan period, but the present disclosure is not limited thereto. For example, the display scan period may include the bias period.

Figure 6:
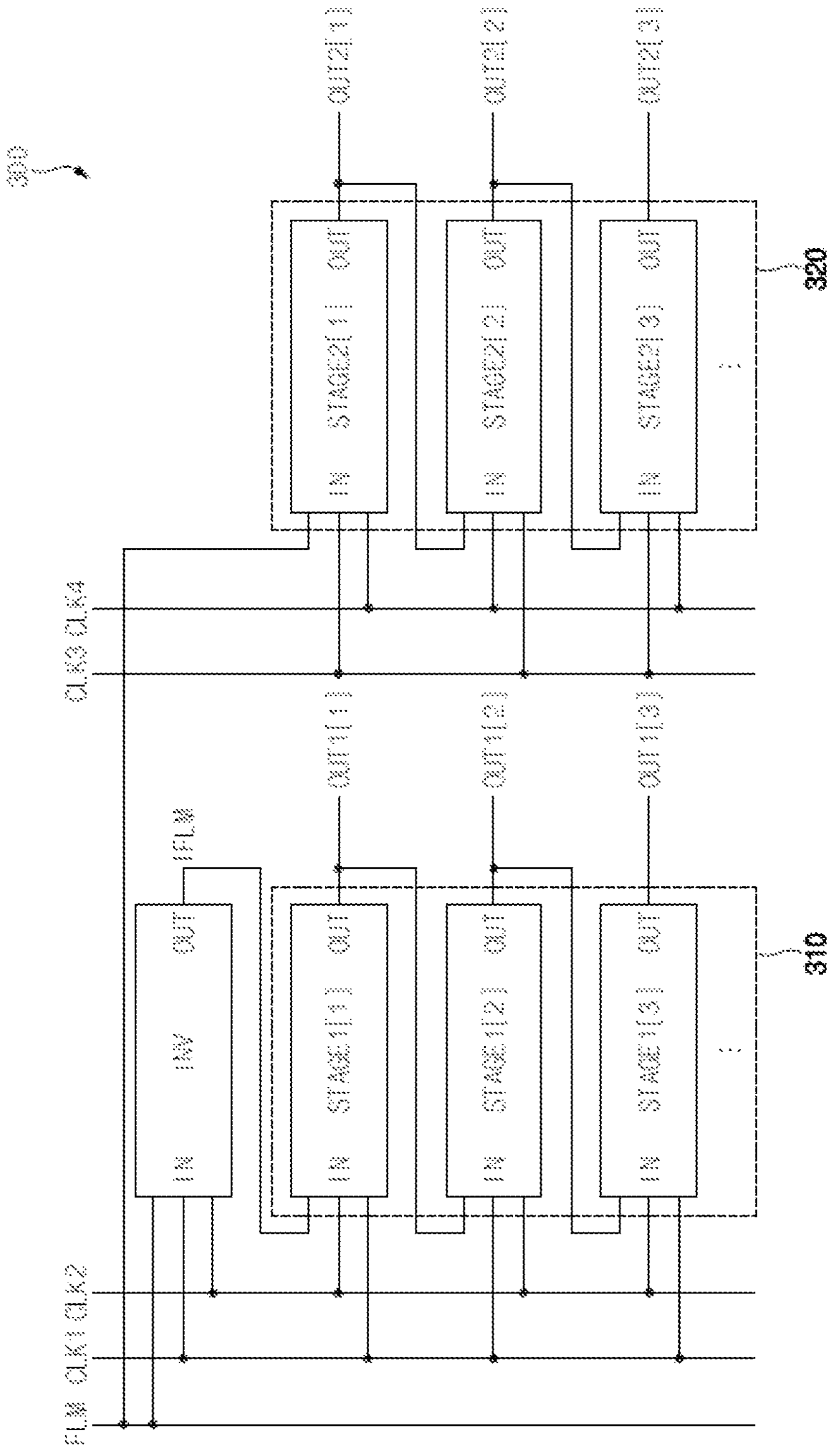
FIG. 6 is a block diagram illustrating an example of a gate driver of the display device of FIG. 1.
Figure 7:
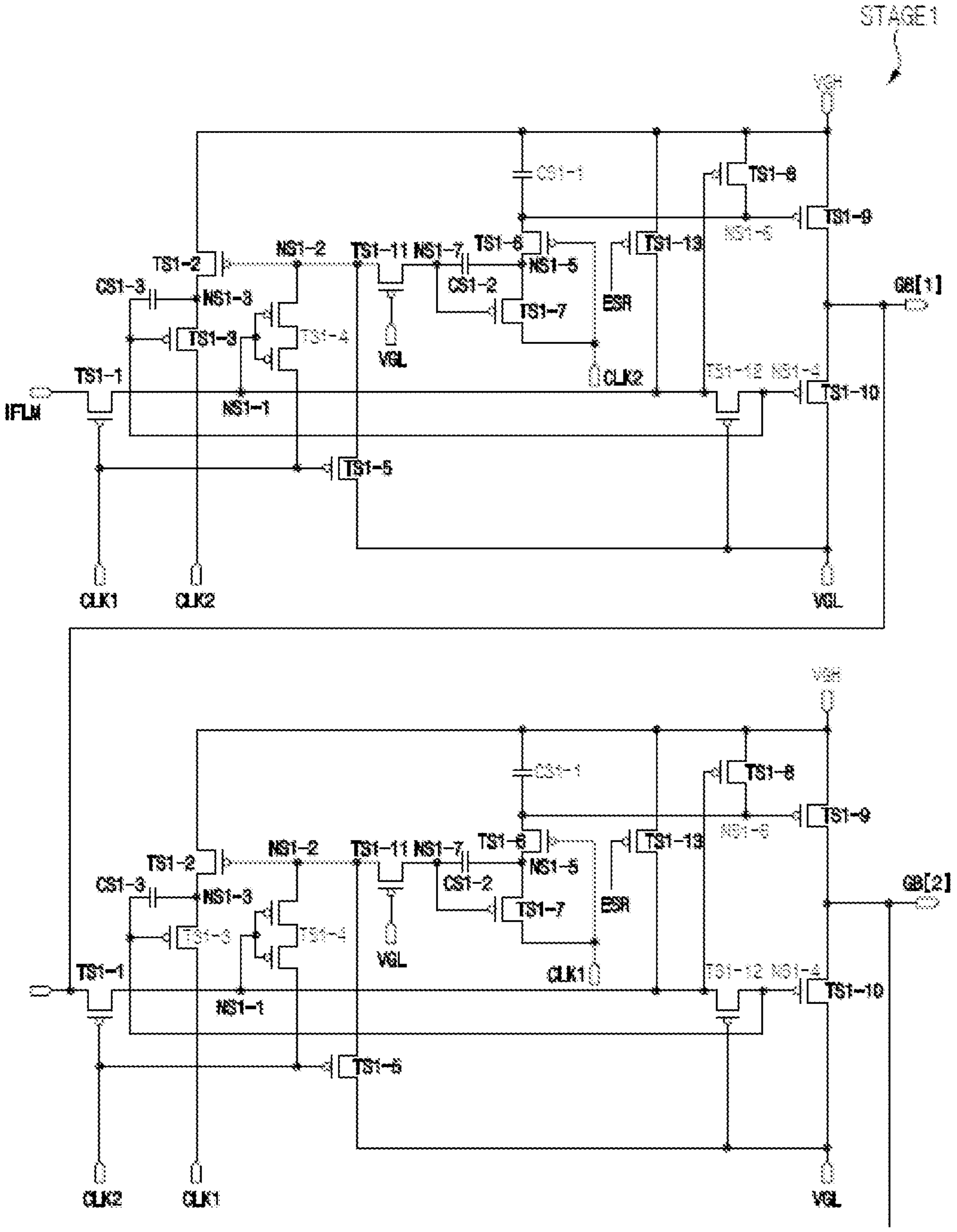
FIG. 7 is a circuit diagram illustrating an example of a first stage of the display device of FIG. 1.
Figure 8:
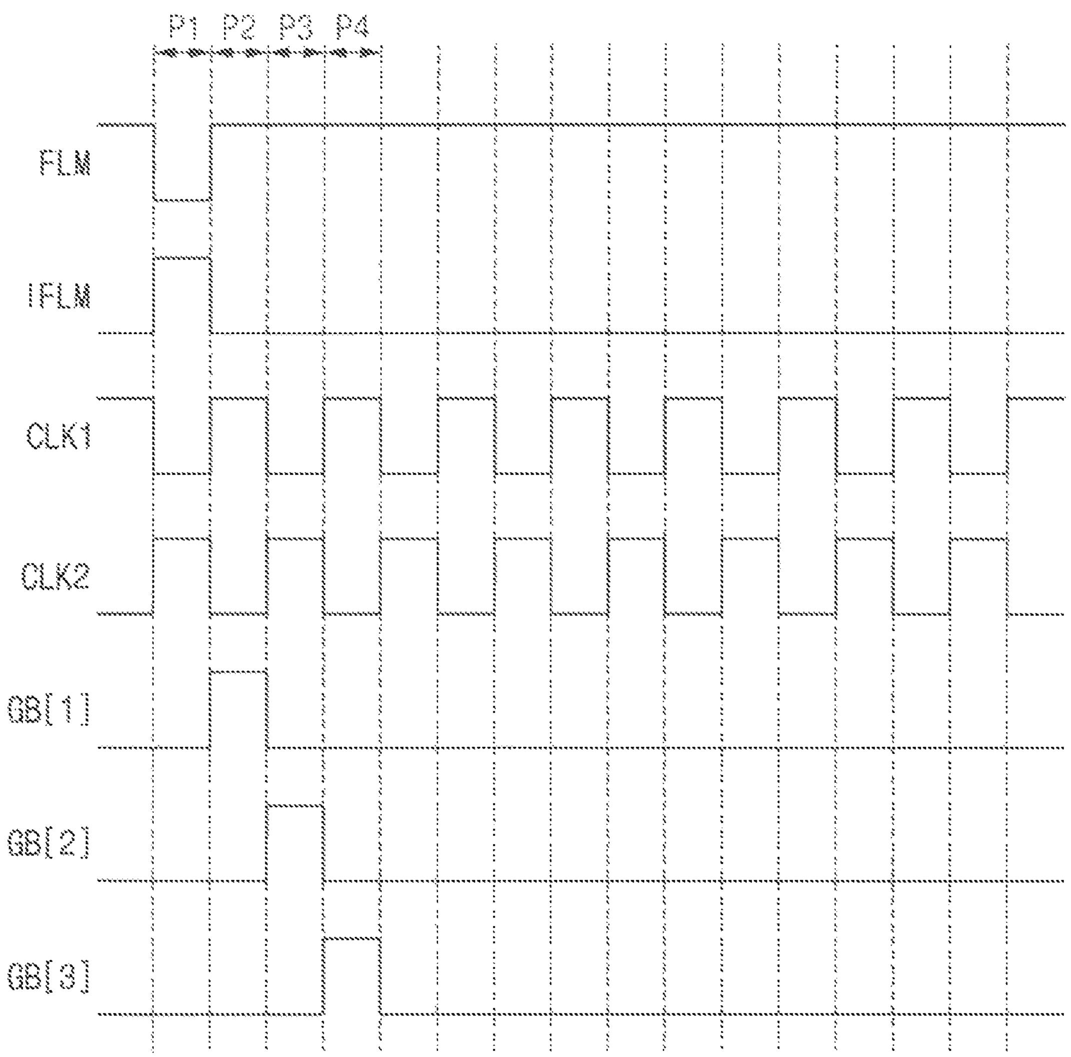
FIG. 8 is a timing diagram illustrating an example in which the display device of FIG. 1 drives a first stage.
Figure 9:
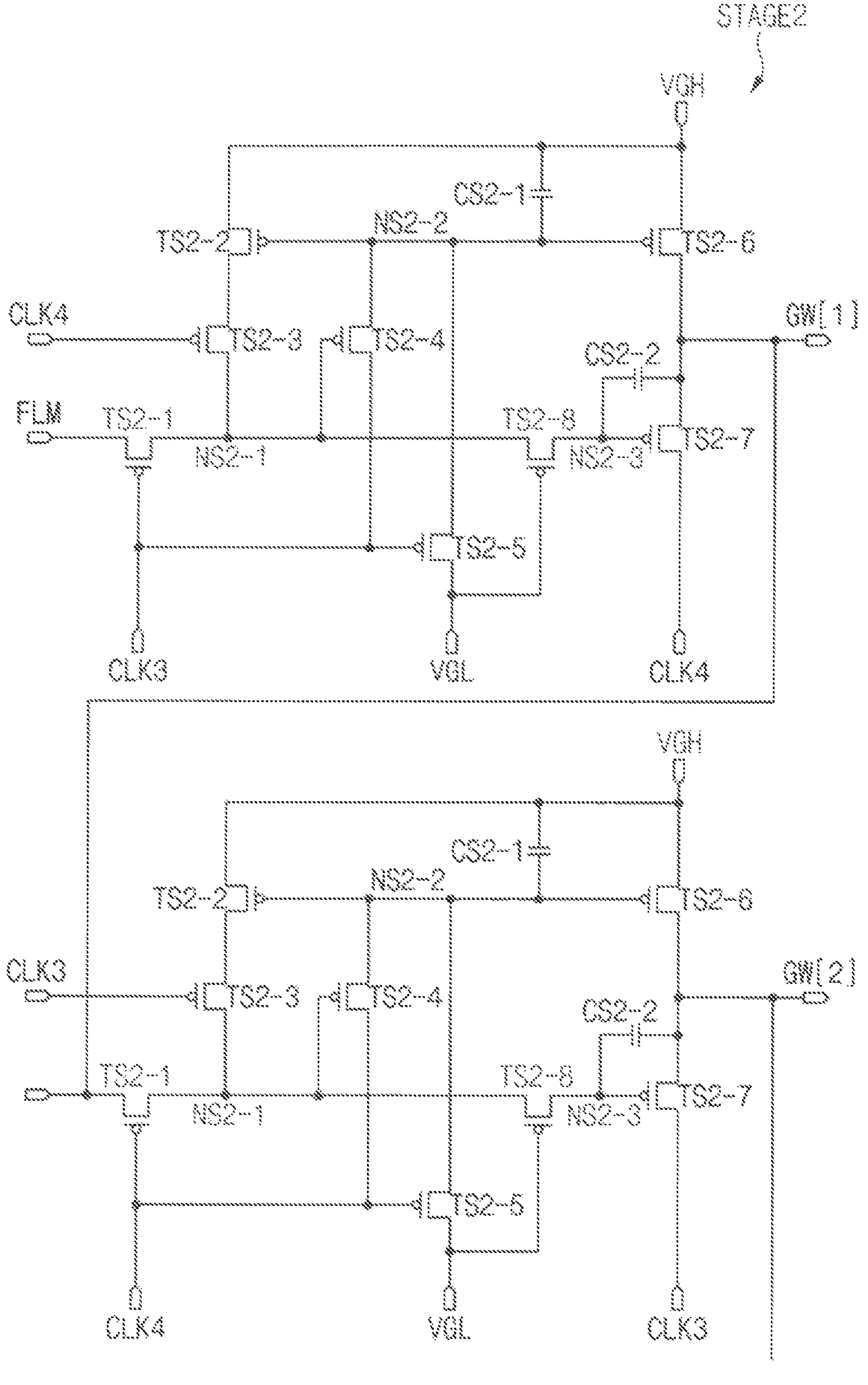
FIG. 9 is a circuit diagram illustrating an example of a second stage of the display device of FIG. 1.
Figure 10:
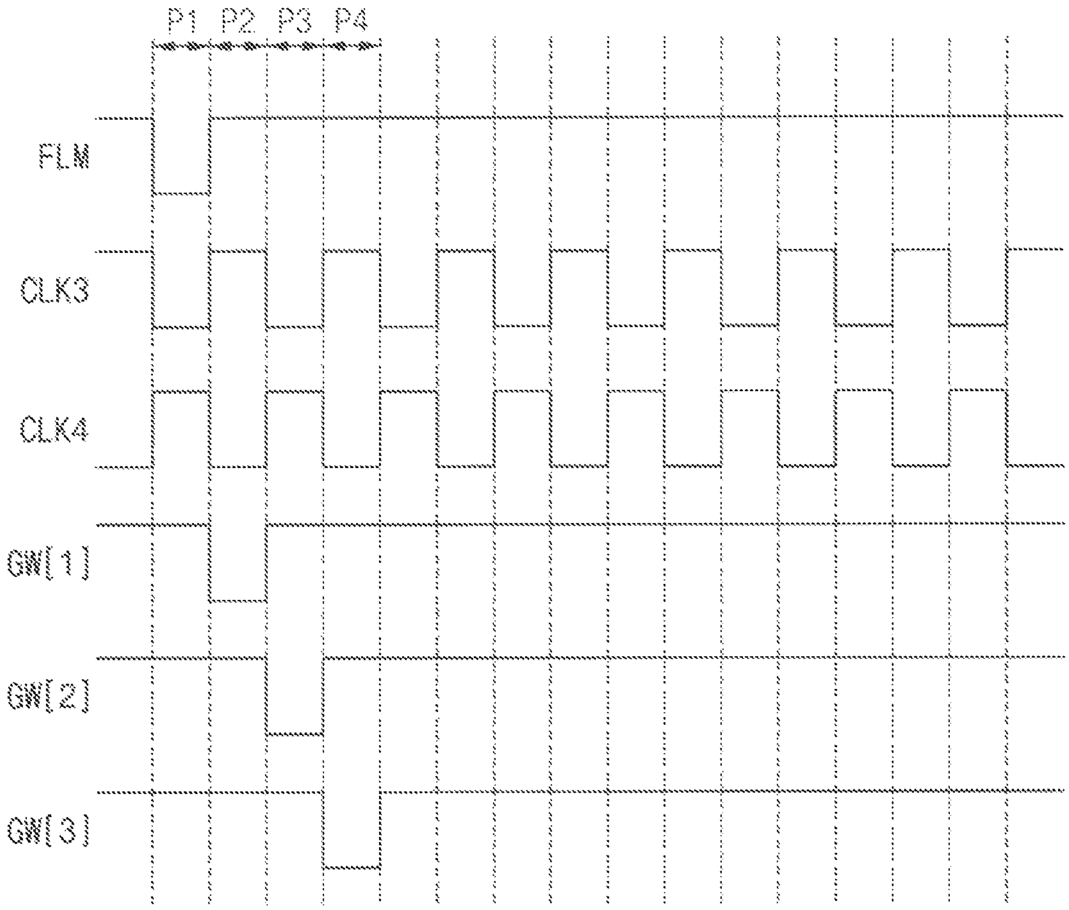
FIG. 10 is a timing diagram illustrating an example in which the display device of FIG. 1 drives a second stage.

FIG. 6 is a block diagram illustrating an example of the gate driver 300 of the display device of FIG. 1, FIG. 7 is a circuit diagram illustrating an example of a first stage STAGE1 of the display device of FIG. 1, FIG. 8 is a timing diagram illustrating an example in which the display device of FIG. 1 drives the first stage STAGE1, FIG. 9 is a circuit diagram illustrating an example of a second stage STAGE2 of the display device of FIG. 1, and FIG. 10 is a timing diagram illustrating an example in which the display device of FIG. 1 drives the second stage STAGE2.

Referring to FIGS. 3 and 6 to 10, the gate driver 300 may include an inverter INV, a first driver 310, and a second driver 320. The first driver 310 may include the first stage STAGE1 that outputs first output signals (OUT1[1], OUT1[2], OUT1[3], . . . ). For example, the first output signals (OUT1[1], OUT1[2], OUT1[3], . . . ) may correspond to the bias gate signal GB. The second driver 320 may include the second stage STAGE2 that outputs second output signals (OUT2[1], OUT2[2], OUT2[3], . . . ). For example, the second output signals (OUT2[1], OUT2[2], OUT2[3], . . . ) may correspond to the write gate signal GW.

For example, the gate driver 300 may include the inverter INV inverting the start signal FLM to generate an inverted start signal IFLM, the first driver 310 including a first stage STAGE1 generating the bias gate signal GB to initialize the light emitting element EE of each of the pixels P in response to the inverted start signal IFLM, and the second driver 320 including the second stage STAGE2 generating the write gate signal GW to apply the data voltages VDATA to the pixels P in response to the start signal FLM. That is, the gate driver 300 may include the first driver 310 for generating the bias gate signal GB and the second driver 320 for generating the write gate signal GW.

For example, the inverter INV may receive a first clock signal CLK1 and a second clock signal CLK2 to invert the start signal FLM and generate the inverted start signal IFLM, and the first stage STAGE1 may receive the first clock signal CLK1 and the second clock signal CLK2 to generate the bias gate signal GB. The second stage STAGE2 may receive the third clock signal CLK3 and the fourth clock signal CLK4 to generate the write gate signal GW.

The pixels P are connected to bias gate lines to which the bias gate signal GB is applied, and the first stages STAGE1 may sequentially output the bias gate signal GB to the bias gate lines. For example, a first bias gate signal GB[1] may be applied to a first bias gate line, a second bias gate signal GB[2] may be applied to a second bias gate line, and a third bias gate signal GB[3] may be applied to a third bias gate line.

The pixels P may be connected to write gate lines to which the write gate signal GW is applied, and the second stages STAGE2 may sequentially output the write gate signal GW to the write gate lines. For example, a first write gate signal GW[1] may be applied to a first write gate line, a second write gate signal GW[2] may be applied to a second write gate line, and a third write gate signal GW[3] may be applied to a third write gate line.

Referring to FIGS. 3 and 6 to 8, each of odd-numbered stages (e.g., STAGE1[1], STAGE1[3], . . . ) among the first stages STAGE1 may include a 1-1th stage transistor TS1-1 including a control electrode receiving the first clock signal CLK1, a first electrode receiving a first input signal, and a second electrode connected to a 1-1th stage node NS1-1, a 1-2th stage transistor TS1-2 including a control electrode connected to a 1-2th stage node NS1-2, a first electrode receiving a high voltage VGH, and a second electrode connected to a 1-3th stage node NS1-3, a 1-3th stage transistor TS1-3 including a control electrode connected to a 1-4th stage node NS1-4, a first electrode receiving the second clock signal CLK2, and a second electrode connected to the 1-3th stage node NS1-3, a 1-4th stage transistor TS1-4 including a control electrode connected to the 1-1th stage node NS1-1, a first electrode receiving the first clock signal CLK1, and a second electrode connected to the 1-2th stage node NS1-2, a 1-5th stage transistor TS1-5 including a control electrode receiving the first clock signal CLK1, a first electrode receiving a low voltage VGL, and a second electrode connected to the 1-2th stage node NS1-2, a 1-6th stage transistor TS1-6 including a control electrode receiving the second clock signal CLK2, a first electrode connected to a 1-5th stage node NS1-5, and a second electrode connected to a 1-6th stage node NS1-6, a 1-7th stage transistor TS1-7 including a control electrode connected to a 1-7th stage node NS1-7, a first electrode receiving the second clock signal CLK2, and a second electrode connected to the 1-5th stage node NS1-5, a 1-8th stage transistor TS1-8 including a control electrode connected to the 1-1th stage node NS1-1, a first electrode receiving the high voltage VGH, and a second electrode connected to the 1-6th stage node NS1-6, a 1-1th stage capacitor CS1-1 including a first electrode receiving the high voltage VGH and a second electrode connected to the 1-6th stage node NS1-6, a 1-9th stage transistor TS1-9 including a control electrode connected to the 1-6th stage node NS1-6, a first electrode receiving the high voltage VGH, and a second electrode connected to an output terminal of the first stage STAGE1, a 1-10th stage transistor TS1-10 including a control electrode connected to the 1-4th stage node NS1-4, a first electrode receiving the low voltage VGL, and a second electrode connected to the output terminal of the first stage STAGE1, a 1-11th stage transistor TS1-11 including a control electrode receiving the low voltage VGL, a first electrode connected to the 1-2th stage node NS1-2, and a second electrode connected to the 1-7th stage node NS1-7, a 1-2th stage capacitor CS1-2 including a first electrode connected to the 1-7th stage node NS1-7 and a second electrode connected to the 1-5th stage node NS1-5, a 1-12th stage transistor TS1-12 including a control electrode receiving the low voltage VGL, a first electrode connected to the 1-1th stage node NS1-1, and a second electrode connected to the 1-4th stage node NS1-4, and a 1-3th stage capacitor CS1-3 including a first electrode connected to the 1-4th stage node NS1-4 and a second electrode connected to the 1-3th stage node NS1-3.

As shown in FIG. 7, the 1-4th stage transistor TS1-4 may have a dual structure. In an embodiment, unlike FIG. 7, the 1-3th stage transistor TS1-3 may have a dual structure. For example, unlike FIG. 7, the 1-3th stage transistor TS1-3 may have a structure in which two transistors are connected in series.

Each of even-numbered stages (e.g., STAGE1[2], . . . ) among the first stages STAGE1 may include a 1-1th stage transistor TS1-1 including a control electrode receiving the second clock signal CLK2, a first electrode receiving a first input signal, and a second electrode connected to a 1-1th stage node NS1-1, a 1-2th stage transistor TS1-2 including a control electrode connected to a 1-2th stage node NS1-2, a first electrode receiving a high voltage VGH, and a second electrode connected to a 1-3th stage node NS1-3, a 1-3th stage transistor TS1-3 including a control electrode connected to a 1-4th stage node NS1-4, a first electrode receiving the first clock signal CLK1, and a second electrode connected to the 1-3th stage node NS1-3, a 1-4th stage transistor TS1-4 including a control electrode connected to the 1-1th stage node NS1-1, a first electrode receiving the second clock signal CLK2, and a second electrode connected to the 1-2th stage node NS1-2, a 1-5th stage transistor TS1-5 including a control electrode receiving the second clock signal CLK2, a first electrode receiving a low voltage VGL, and a second electrode connected to the 1-2th stage node NS1-2, a 1-6th stage transistor TS1-6 including a control electrode receiving the first clock signal CLK1, a first electrode connected to a 1-5th stage node NS1-5, and a second electrode connected to a 1-6th stage node NS1-6, a 1-7th stage transistor TS1-7 including a control electrode connected to a 1-7th stage node NS1-7, a first electrode receiving the first clock signal CLK1, and a second electrode connected to the 1-5th stage node NS1-5, a 1-8th stage transistor TS1-8 including a control electrode connected to the 1-1th stage node NS1-1, a first electrode receiving the high voltage VGH, and a second electrode connected to the 1-6th stage node NS1-6, a 1-1th stage capacitor CS1-1 including a first electrode receiving the high voltage VGH and a second electrode connected to the 1-6th stage node NS1-6, a 1-9th stage transistor TS1-9 including a control electrode connected to the 1-6th stage node NS1-6, a first electrode receiving the high voltage VGH, and a second electrode connected to an output terminal of the first stage STAGE1, a 1-10th stage transistor TS1-10 including a control electrode connected to the 1-4th stage node NS1-4, a first electrode receiving the low voltage VGL, and a second electrode connected to the output terminal of the first stage STAGE1, a 1-11th stage transistor TS1-11 including a control electrode receiving the low voltage VGL, a first electrode connected to the 1-2th stage node NS1-2, and a second electrode connected to the 1-7th stage node NS1-7, a 1-2th stage capacitor CS1-2 including a first electrode connected to the 1-7th stage node NS1-7 and a second electrode connected to the 1-5th stage node NS1-5, a 1-12th stage transistor TS1-12 including a control electrode receiving the low voltage VGL, a first electrode connected to the 1-1th stage node NS1-1, and a second electrode connected to the 1-4th stage node NS1-4, and a 1-3th stage capacitor CS1-3 including a first electrode connected to the 1-4th stage node NS1-4 and a second electrode connected to the 1-3th stage node NS1-3. As shown in FIG. 7, the 1-4th stage transistor TS1-4 may have a dual structure. In an embodiment, unlike FIG. 7, the 1-3th stage transistor TS1-3 may have a dual structure.

In an embodiment, the first stage STAGE1 may further include a 1-13th stage transistor TS1-13 including a control electrode receiving a scan initialization signal ESR, the first electrode receiving the high voltage VGH, and a second electrode connected to the 1-1th stage node NS1-1.

For example, the high voltage VGH may be a voltage having a high voltage level. The low voltage VGL may be a voltage having a low voltage level. The scan initialization signal ESR may have a pulse having the activation level when the display device 10 is powered on. The scan initialization signal ESR may have the inactivation level when the display device 10 is driven. Accordingly, when the display device 10 is powered on, the 1-1th stage node NS1-1 may be initialized to the high voltage level.

STAGE1[1] first outputting the bias gate signal GB in one frame may receive the inverted start signal IFLM as the first input signal. In one frame, the first stages (STAGE1[2], STAGE1[3], . . . ) among the first stages STAGE1 except for STAGE1[1] first outputting the bias gate signal GB may receive an output signal of a previous first stage STAGE1 as the first input signals. For example, as shown in FIGS. 6 and 8, STAGE1[3]thirdly outputting the bias gate signal GB in one frame may receive the bias gate signal GB[2] secondly output as the first input signal.

For example, in a first period P1 of STAGE1[1], the 1-1th stage transistor TS1-1 may transmit the inverted start signal IFLM having the high voltage level to the 1-1th stage node NS1-1 in response to the first clock signal CLK1. Since the 1-12th stage transistor TS1-12 is always turned on, the inverted start signal IFLM having the high voltage level may be transmitted to the 1-4th stage node NS1-4 (i.e., the control electrode of the 1-10th stage transistors TS1-10). Accordingly, the 1-10th stage transistor TS1-10 may be turned off. In addition, the 1-5th stage transistor TS1-5 may transmit the low voltage VGL to the 1-2th stage node NS1-2 in response to the first clock signal CLK1. Since the 1-11th stage transistor TS1-11 is always turned on, the low voltage VGL may be transmitted to the 1-7th stage node NS1-7 (i.e., the control electrode of the 1-7th stage transistor TS1-7).

For example, in a second period P2 of STAGE1[1], the 1-7th stage transistor TS1-7 may transmit the second clock signal CLK2 having the low voltage level in response to a signal of the 1-7th stage node NS1-7. The 1-6th stage transistor TS1-6 may transmit the second clock signal CLK2 having the low voltage level to the 1-6th stage node NS1-6 in response to the second clock signal CLK2 having the low voltage level. Accordingly, the 1-9th stage transistor TS1-9 may be turned on, the 1-10th stage transistor TS1-10 may be turned off, and the bias gate signal GB[1] having the high voltage level may be output to the output terminal of STAGE1[1]. STAGE1[2] may receive the bias gate signal GB[1] having the high voltage level from STAGE1[1] and start an operation similar to that of the first period P1 of STAGE1[1].

For example, in a third period P3 of STAGE1[1], the 1-1th stage transistor TS1-1 may transmit the inverted start signal IFLM having the low voltage level to the 1-1th stage node NS1-1 in response to the first clock signal CLK1. Since the 1-12th stage transistor TS1-12 is always turned on, the inverted start signal IFLM having the low voltage level may be transmitted to the 1-4th stage node NS1-4 (i.e., the control electrode of the 1-10th stage transistors TS1-10). And, the 1-8th stage transistor TS1-8 may transmit the high voltage VGH to the 1-6th stage node NS1-6 in response to a signal of the 1-1th stage node NS1-1 having the low voltage level. Accordingly, the 1-9th stage transistor TS1-9 may be turned off, and the 1-10th stage transistor TS1-10 may be turned on, so that the bias gate signal GB[1] having the low voltage level may be output to the output terminal of STAGE1[1].

For example, in a second period P2 of STAGE1[2], the 1-1th stage transistor TS1-1 may transmit the bias gate signal GB[1] having the high voltage level to the 1-1th stage node NS1-1 in response to the second clock signal CLK2. Since the 1-12th stage transistor TS1-12 is always turned on, the bias gate signal GB[1] having the high voltage level may be transmitted to the 1-4th stage node NS1-4 (i.e., the control electrode of the 1-10th stage transistors TS1-10). Accordingly, the 1-10th stage transistor TS1-10 may be turned off. In addition, the 1-5th stage transistor TS1-5 may transmit the low voltage VGL to the 1-2th stage node NS1-2 in response to the second clock signal CLK2. Since the 1-11th stage transistor TS1-11 is always turned on, the low voltage VGL may be transmitted to the 1-7th stage node NS1-7 (i.e., the control electrode of the 1-7th stage transistor TS1-7).

For example, in a third period P3 of STAGE1[2], the 1-7th stage transistor TS1-7 may transmit the first clock signal CLK1 having the low voltage level in response to a signal of the 1-7th stage node NS1-7. The 1-6th stage transistor TS1-6 may transmit the first clock signal CLK1 having the low voltage level to the 1-6th stage node NS1-6 in response to the first clock signal CLK1 having the low voltage level. Accordingly, the 1-9th stage transistor TS1-9 may be turned on, the 1-10th stage transistor TS1-10 may be turned off, and the bias gate signal GB[2] having the high voltage level may be output to the output terminal of STAGE1[2]. STAGE1[3] may receive the bias gate signal GB[2] having the high voltage level from STAGE1[2] and start an operation similar to that of the second period P2 of STAGE1[2].

For example, in a fourth period P4 of STAGE1[2], the 1-1th stage transistor TS1-1 may transmit the inverted start signal IFLM having the low voltage level to the 1-1th stage node NS1-1 in response to the second clock signal CLK2. Since the 1-12th stage transistor TS1-12 is always turned on, the inverted start signal IFLM having the low voltage level may be transmitted to the 1-4th stage node NS1-4 (i.e., the control electrode of the 1-10th stage transistors TS1-10). And, the 1-8th stage transistor TS1-8 may transmit the high voltage VGH to the 1-6th stage node NS1-6 in response to a signal of the 1-1th stage node NS1-1 having the low voltage level. Accordingly, the 1-9th stage transistor TS1-9 may be turned off, and the 1-10th stage transistor TS1-10 may be turned on, so that the bias gate GB[2] having the low voltage level may be output to the output terminal of STAGE1[2].

Referring to FIGS. 3, 6, 9, and 10, each of odd-numbered stages (e.g., STAGE2[1], STAGE2[3], . . . ) among the second stages STAGE2 may include a 2-1th stage transistor TS2-1 including a control electrode receiving the third clock signal CLK3, a first electrode receiving a second input signal, and a second electrode connected to a 2-1th stage node NS2-1, a 2-2th stage transistor TS2-2 including a control electrode connected to a 2-2th stage node NS2-2, a first electrode receiving the high voltage VGH, and a second electrode connected to a first electrode of a 2-3th stage transistor TS2-3, the 2-3th stage transistor TS2-3 including a control electrode receiving the fourth clock signal CLK4, the first electrode connected to the second electrode of the 2-2th stage transistor TS2-2, and a second electrode connected to the 2-1th stage node NS2-1, a 2-4th stage transistor TS2-4 including a control electrode connected to the 2-1th stage node NS2-1, a first electrode receiving the third clock signal CLK3, and a second electrode connected to the 2-2th stage node NS2-2, a 2-5th stage transistor TS2-5 including a control electrode receiving the third clock signal CLK3, a first electrode receiving the low voltage VGL, and a second electrode connected to the 2-2th stage node NS2-2, a 2-6th stage transistor TS2-6 including a control electrode connected to the 2-2th stage node NS2-2, a first electrode receiving the high voltage VGH, and a second electrode connected to an output terminal of the second stage STAGE2, a 2-1th stage capacitor CS2-1 including a first electrode receiving the high voltage VGH and a second electrode connected to the 2-2th stage node NS2-2, a 2-7th stage transistor TS2-7 including a control electrode connected to a 2-3th stage node NS2-3, a first electrode receiving the fourth clock signal CLK4, and a second electrode connected to the output terminal of the second stage STAGE2, a 2-2th stage capacitor CS2-2 including a first electrode connected to the 2-3th stage node NS2-3 and a second electrode connected to the output terminal of the second stage STAGE2, and a 2-8th stage transistor TS2-8 including a control electrode receiving the low voltage VGL, a first electrode connected to the 2-1th stage node NS2-1, and a second electrode connected to the 2-3th stage node NS2-3.

Each of even-numbered stages (e.g., STAGE2[2], . . . ) among the second stages STAGE2 may include a 2-1th stage transistor TS2-1 including a control electrode receiving the fourth clock signal CLK4, a first electrode receiving a second input signal, and a second electrode connected to a 2-1th stage node NS2-1, a 2-2th stage transistor TS2-2 including a control electrode connected to a 2-2th stage node NS2-2, a first electrode receiving the high voltage VGH, and a second electrode connected to a first electrode of a 2-3th stage transistor TS2-3, the 2-3th stage transistor TS2-3 including a control electrode receiving the third clock signal CLK3, the first electrode connected to the second electrode of the 2-2th stage transistor TS2-2, and a second electrode connected to the 2-1th stage node NS2-1, a 2-4th stage transistor TS2-4 including a control electrode connected to the 2-1th stage node NS2-1, a first electrode receiving the fourth clock signal CLK4, and a second electrode connected to the 2-2th stage node NS2-2, a 2-5th stage transistor TS2-5 including a control electrode receiving the fourth clock signal CLK4, a first electrode receiving the low voltage VGL, and a second electrode connected to the 2-2th stage node NS2-2, a 2-6th stage transistor TS2-6 including a control electrode connected to the 2-2th stage node NS2-2, a first electrode receiving the high voltage VGH, and a second electrode connected to an output terminal of the second stage STAGE2, a 2-1th stage capacitor CS2-1 including a first electrode receiving the high voltage VGH and a second electrode connected to the 2-2th stage node NS2-2, a 2-7th stage transistor TS2-7 including a control electrode connected to a 2-3th stage node NS2-3, a first electrode receiving the third clock signal CLK3, and a second electrode connected to the output terminal of the second stage STAGE2, a 2-2th stage capacitor CS2-2 including a first electrode connected to the 2-3th stage node NS2-3 and a second electrode connected to the output terminal of the second stage STAGE2, and a 2-8th stage transistor TS2-8 including a control electrode receiving the low voltage VGL, a first electrode connected to the 2-1th stage node NS2-1, and a second electrode connected to the 2-3th stage node NS2-3.

STAGE2[1] first outputting the write gate signal GW in one frame may receive the start signal FLM as the second input signal. In one frame, the second stages (STAGE2[2], STAGE2[3], . . . ) among the second stages STAGE2 except for STAGE2[1] first outputting the write gate signal GW may receive an output signal of a previous second stage STAGE2 as the second input signals. For example, as shown in FIGS. 6 and 10, STAGE2[3] thirdly outputting the write gate signal GW in one frame may receive the write gate signal GW[2] secondly output as the second input signal.

For example, in a first period P1 of STAGE2[1], the 2-1th stage transistor TS2-1 may transmit the start signal FLM having the low voltage level to the 2-1th stage node NS2-1 in response to the third clock signal CLK3. Since the 2-8th stage transistor TS2-8 is always turned on, the start signal FLM having the low voltage level may be transmitted to the 2-3th stage node NS2-3 (i.e., the control electrode of the 2-7th stage transistors TS2-7). And, the 2-5th stage transistor TS2-5 may transmit the low voltage VGL to the 2-2th stage node NS2-2 in response to the third clock signal CLK3. Also, the 2-4th stage transistor TS2-4 may transmit the third clock signal CLK3 having the low voltage level to the 2-2th stage node NS2-2 in response to a signal of the 2-1th stage node NS2-1. Accordingly, the 2-6th stage transistor TS2-6 and the 2-7th stage transistor TS2-7 may be turned on. In addition, since the fourth clock signal CLK4 has the high voltage level, the write gate signal GW[1] having the high voltage level may be output to the output terminal of STAGE2[1].

For example, in a second period P2 of STAGE2[1], the 2-4th stage transistor TS2-4 may transmit the third clock signal CLK3 having the high voltage level to the 2-2th stage node NS2-2 in response to a signal of the 2-1th stage node NS2-1. Accordingly, the 2-6th stage transistor TS2-6 may be turned off, the 2-7th stage transistor TS2-7 may be turned on, and the write gate signal GW[1] having the low voltage level may be output to the output terminal of STAGE2[1]. STAGE2[2] may receive the write gate signal GW[1] having the low voltage level from STAGE2[1] and start an operation similar to that of the first period P1 of STAGE2[1].

For example, in a third period P3 of STAGE2[1], the 2-1th stage transistor TS2-1 may transmit the start signal FLM having the high voltage level to the 2-1th stage node NS2-1 in response to the third clock signal CLK3. Since the 2-8th stage transistor TS2-8 is always turned on, the start signal FLM having the high voltage level may be transmitted to the 2-3th stage node NS2-3 (i.e., the control electrode of the 2-7th stage transistors TS2-7). And, the 2-5th stage transistor TS2-5 may transmit the low voltage VGL to the 2-2th stage node NS2-2 in response to the third clock signal CLK3 having the low voltage level. Accordingly, the 2-6th stage transistor TS2-6 may be turned on, the 2-7th stage transistor TS2-7 may be turned off, and the write gate signal GW[1] having the high voltage level may be output to the output terminal of STAGE2[1].

For example, in a second period P2 of STAGE2[2], the 2-1th stage transistor TS2-1 may transmit the write gate signal GW[1] having the low voltage level to the 2-1th stage node NS2-1 in response to the fourth clock signal CLK4. Since the 2-8th stage transistor TS2-8 is always turned on, the start signal FLM having the low voltage level may be transmitted to the 2-3th stage node NS2-3 (i.e., the control electrode of the 2-7th stage transistors TS2-7). And, the 2-5th stage transistor TS2-5 may transmit the low voltage VGL to the 2-2th stage node NS2-2 in response to the fourth clock signal CLK4. Also, the 2-4th stage transistor TS2-4 may transmit the fourth clock signal CLK4 having the low voltage level to the 2-2th stage node NS2-2 in response to a signal of the 2-1th stage node NS2-1. Accordingly, the 2-6th stage transistor TS2-6 and the 2-7th stage transistor TS2-7 may be turned on. In addition, since the third clock signal CLK3 has the high voltage level, the write gate signal GW[2] having the high voltage level may be output to the output terminal of STAGE2[2].

For example, in a third period P3 of STAGE2[2], the 2-4th stage transistor TS2-4 may transmit the fourth clock signal CLK4 having the high voltage level to the 2-2th stage node NS2-2 in response to a signal of the 2-1th stage node NS2-1. Accordingly, the 2-6th stage transistor TS2-6 may be turned off, the 2-7th stage transistor TS2-7 may be turned on, and the write gate signal GW[2] having the low voltage level may be output to the output terminal of STAGE2[2]. STAGE2[3] may receive the write gate signal GW[2] having the low voltage level from STAGE2[2] and start an operation similar to that of the second period P2 of STAGE2[2].

For example, in a fourth period P4 of STAGE2[2], the 2-1th stage transistor TS2-1 may transmit the start signal FLM having the high voltage level to the 2-1th stage node NS2-1 in response to the fourth clock signal CLK4. Since the 2-8th stage transistor TS2-8 is always turned on, the start signal FLM having the high voltage level may be transmitted to the 2-3th stage node NS2-3 (i.e., the control electrode of the 2-7th stage transistors TS2-7). And, the 2-5th stage transistor TS2-5 may transmit the low voltage VGL to the 2-2th stage node NS2-2 in response to the fourth clock signal CLK4 having the low voltage level. Accordingly, the 2-6th stage transistor TS2-6 may be turned on, the 2-7th stage transistor TS2-7 may be turned off, and the write gate signal GW[2] having the high voltage level may be output to the output terminal of STAGE2[2].

As such, the gate driver 300 may generate the write gate signal GW and the bias gate signal GB using one start signal FLM. Accordingly, the display device 10 may perform the bias operation and the light emitting element initialization operation in the self-scan period without adding a start signal. In addition, a size of the gate driver 300 is reduced, and accordingly, the gate driver 300 may be efficiently disposed.

Figure 11:
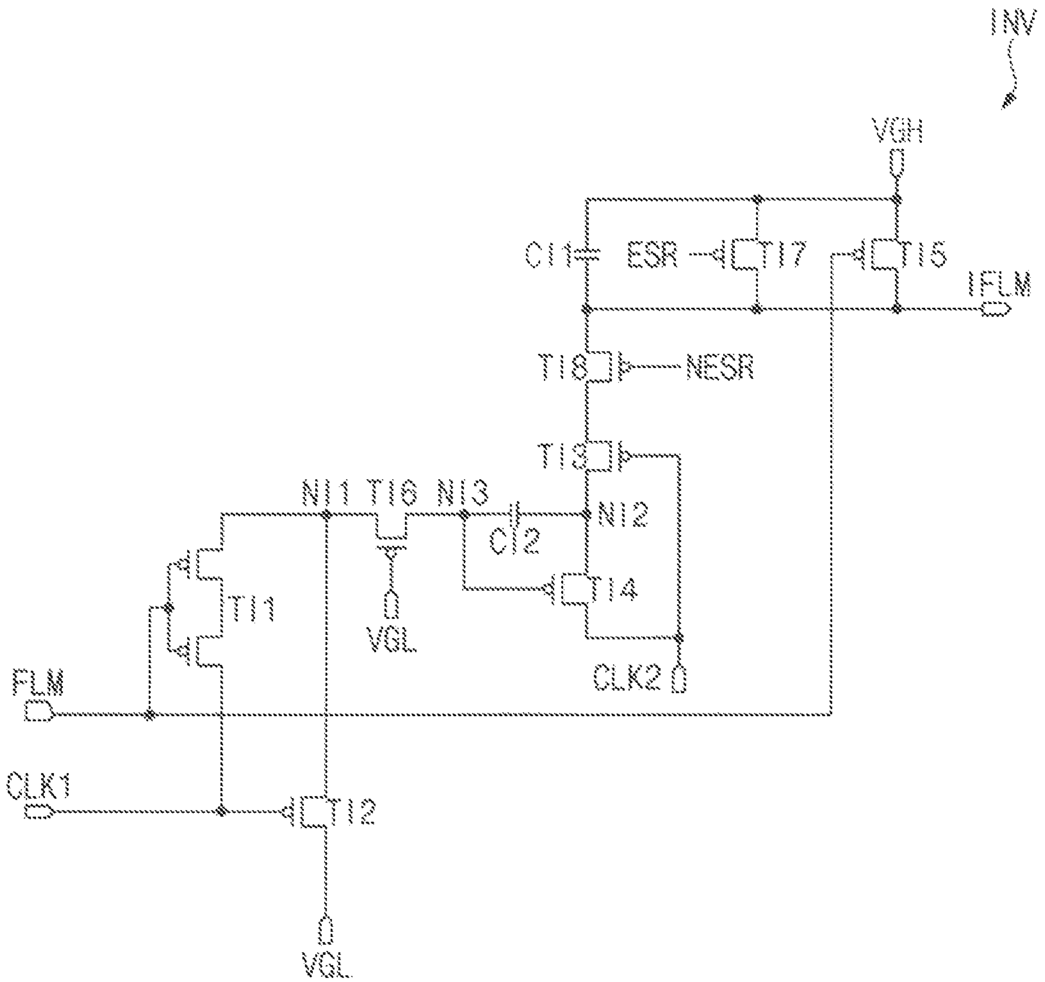
FIG. 11 is a circuit diagram illustrating an example of an inverter of the display device of FIG. 1.

FIG. 11 is a circuit diagram illustrating an example of the inverter INV of the display device of FIG. 1.

Referring to FIG. 11, the inverter INV may include a first inverter transistor TI1 including a control electrode receiving the start signal FLM, a first electrode receiving a first clock signal CLK1, and a second electrode connected to a first inverter node NI1, a second inverter transistor TI2 including a control electrode receiving the first clock signal CLK1, a first electrode receiving the low voltage VGL, and a second electrode connected to the first inverter node NI1, a third inverter transistor TI3 including a control electrode receiving the second clock signal CLK2, a first electrode connected to a second inverter node NI2, and a second electrode connected to an output terminal of the inverter INV, a fourth inverter transistor TI4 including a control electrode connected to a third inverter node NI3, a first electrode receiving the second clock signal CLK2, and a second electrode connected to the second inverter node NI2, a fifth inverter transistor TI5 including a control electrode receiving the start signal FLM, a first electrode receiving the high voltage VGH, and a second electrode connected to the output terminal of the inverter INV, a first inverter capacitor CI1 including a first electrode receiving the high voltage VGH and a second electrode connected to the output terminal of the inverter INV, a sixth inverter transistor TI6 including a control electrode receiving the low voltage VGL, a first electrode connected to the first inverter node NI1, and a second electrode connected to the third inverter node NI3, and a second inverter capacitor CI2 including a first electrode connected to the third inverter node NI3 and a second electrode connected to the second inverter node NI2. As shown in FIG. 11, the first inverter transistor TI1 may have a dual structure. In an embodiment, unlike FIG. 11, the fourth inverter transistor TI4 may have a dual structure.

In an embodiment, the inverter INV may further include a seventh inverter transistor TI7 including a control electrode receiving a scan initialization signal ESR, a first electrode receiving the high voltage VGH, and a second electrode connected to the output terminal of the inverter INV. The inverter INV may further include a eighth inverter transistor TI8 including a control electrode receiving an inverted scan initialization signal NESR, a first electrode connected to the output terminal of the inverter INV, and a second electrode connected to the second electrode of the third inverter transistor TI3.

The scan initialization signal ESR may have a pulse having the activation level when the display device 10 is powered on. The inverted scan initialization signal NESR may be a signal in which the scan initialization signal ESR is inverted. The scan initialization signal ESR may have the inactivation level when the display device 10 is driven. Accordingly, when the display device 10 is powered on, the output terminal of the inverter INV may be initialized to the high voltage level. Also, since the eighth inverter transistor TI8 is turned on when the display device 10 is driven, the eighth inverter transistor TI8 may connect the third inverter transistor TI3 to the output terminal of the inverter INV.

Referring to FIGS. 8 and 11, for example, in a first period P1 of the inverter INV, since the sixth inverter transistor TI6 is always turned on, the first inverter transistor TI1 may transmit the first clock signal CLK1 to the third inverter node NI3 in response to the start signal FLM having the low voltage level. The fifth inverter transistor TI5 may transmit the high voltage VGH to the output terminal of the inverter INV in response to the start signal FLM having the low voltage level.

For example, in a second period P2 of the inverter INV, the fourth inverter transistor TI4 may transmit the second clock signal CLK2 having the low voltage level to the second inverter node NI2 in response to a signal of the third inverter node NI3. The third inverter transistor TI3 may transmit a signal of the second inverter node NI2 (i.e., the second clock signal CLK2 having the low voltage level) to the output terminal of the inverter INV in response to the second clock signal CLK2.

That is, a signal of the output terminal of the inverter INV may be the same as a signal obtained by inverting the start signal FLM. Accordingly, the inverter INV may generate the inverted output signal IFLM by inverting the start signal FLM.

Figure 12:
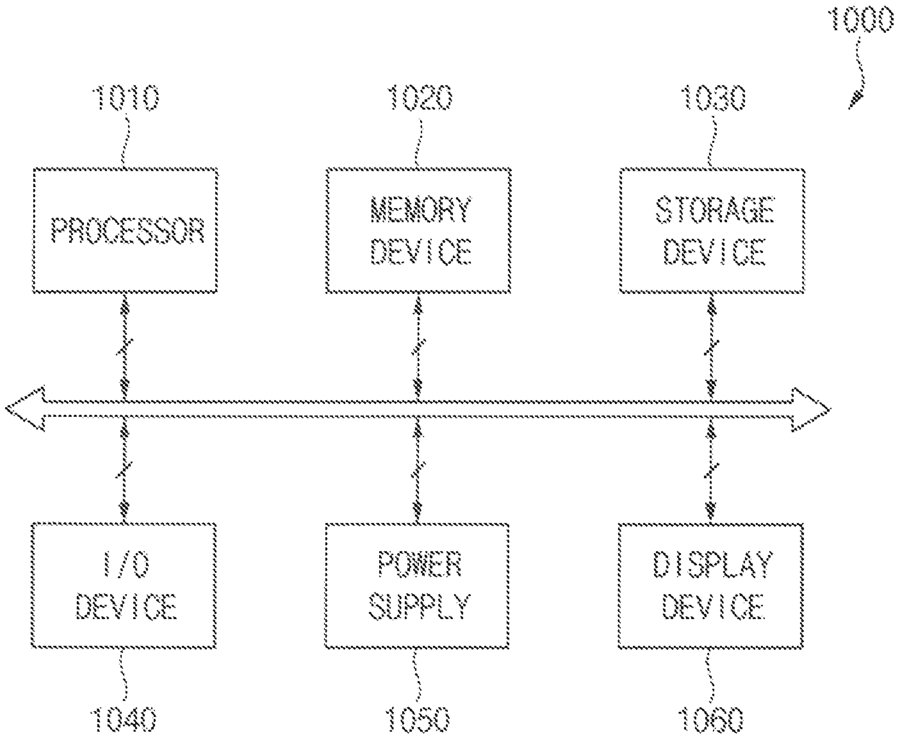
FIG. 12 is a block diagram showing an electronic device according to embodiments of the present disclosure.
Figure 13:
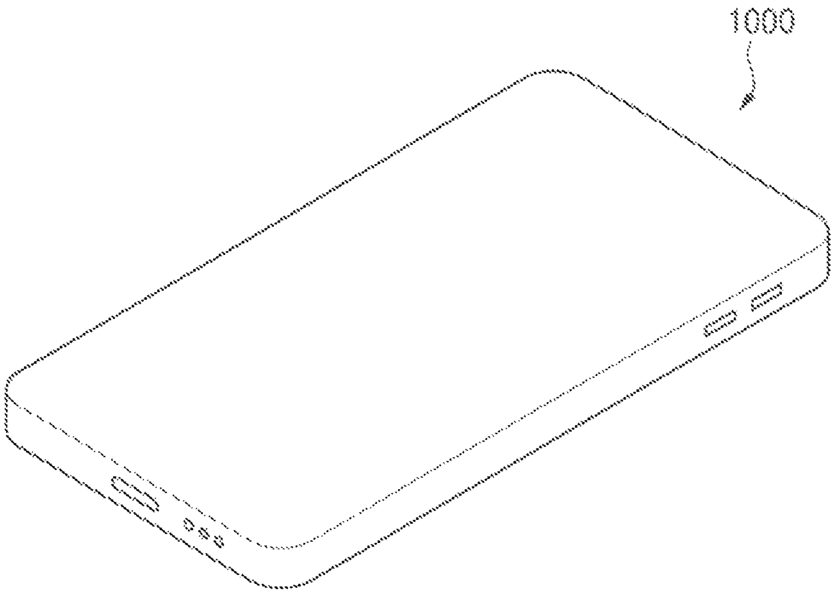
FIG. 13 is a diagram showing an example in which the electronic device of FIG. 12 is implemented as a smart phone.

FIG. 12 is a block diagram showing an electronic device according to embodiments of the present disclosure, and FIG. 13 is a diagram showing an example in which the electronic device of FIG. 12 is implemented as a smart phone.

Referring to FIGS. 12 and 13, the electronic device 1000 may include a processor 1010, a memory device 1020, a storage device 1030, an input/output (I/O) device 1040, a power supply 1050, and a display device 1060. Here, the display device 1060 may be the display device 10 of FIG. 1. In addition, the electronic device 1000 may further include a plurality of ports for communicating with a video card, a sound card, a memory card, a universal serial bus (USB) device, other electronic devices, etc. In an embodiment, as shown in FIG. 13, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, etc.

The processor 1010 may perform various computing functions. The processor 1010 may be a micro processor, a central processing unit (CPU), an application processor (AP), etc. The processor 1010 may be coupled to other components via an address bus, a control bus, a data bus, etc. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc and/or at least one volatile memory device such as a dynamic random access memory (DRAM) device, a static random access memory (SRAM) device, a mobile DRAM device, etc.

The storage device 1030 may include a solid state drive (SSD) device, a hard disk drive (HDD) device, a CD-ROM device, etc.

The I/O device 1040 may include an input device such as a keyboard, a keypad, a mouse device, a touch pad, a touch screen, etc, and an output device such as a printer, a speaker, etc. In some embodiments, the I/O device 1040 may include the display device 1060.

The power supply 1050 may provide power for operations of the electronic device 1000. For example, the power supply 1050 may be a power management integrated circuit (PMIC).

The display device 1060 may display an image corresponding to visual information of the electronic device 1000. For example, the display device 1060 may be an organic light emitting display device or a quantum dot light emitting display device, but is not limited thereto. The display device 1060 may be coupled to other components via the buses or other communication links. Here, a gate driver of the display device 1060 may generate a plurality of the gate signals using one start signal. Accordingly, the size of the gate driver may be reduced and the gate driver may be efficiently disposed.

The disclosure may be applied to any electronic device including the display device. For example, the disclosure may be applied to a television (TV), a digital TV, a 3D TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

The foregoing is illustrative of the present disclosure and is not to be construed as limiting thereof. Although a few example embodiments of the present disclosure have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific example embodiments disclosed, and that modifications to the disclosed example embodiments, as well as other example embodiments, are intended to be included within the scope of the appended claims. The present disclosure is defined by the following claims, with equivalents of the claims to be included therein.

What is claimed is:

1. A gate driver of a display device comprising:

an inverter configured to invert a start signal to generate an inverted start signal;

a first driver including a first stage configured to generate a bias gate signal to initialize a light emitting element of each of pixels in the display device in response to the inverted start signal; and a second driver including a second stage configured to generate a write gate signal to apply data voltages to the pixels in the display device in response to the start signal, wherein the first driver further receives a first clock signal and a second clock signal whose phase is different than the first clock signal to generate the bias gate signal.

2. The gate driver of claim 1, wherein the write gate signal has an activation period in a display scan period in which the data voltages are written to a storage capacitor of each of the pixels in the display device and in a self-scan period in which the data voltages are not written to the storage capacitor of each of the pixels in the display device.

3. The gate driver of claim 1, wherein the bias gate signal has an activation period in a display scan period in which the data voltages are written to a storage capacitor of each of the pixels in the display device and in a self-scan period in which the data voltages are not written to the storage capacitor of each of the pixels in the display device.

4. The gate driver of claim 1, wherein the inverter is configured to receive the first clock signal and the second clock signal to generate the inverted start signal.

5. The gate driver of claim 4, wherein the second stage is configured to receive a third clock signal and a fourth clock signal to generate the write gate signal.

6. The gate driver of claim 1, wherein each of the pixels in the display device includes:

a first pixel transistor including a control electrode connected to a first pixel node, a first electrode connected to a second pixel node, and a second electrode connected to a third pixel node;

a second pixel transistor including a control electrode configured to receive the write gate signal, a first electrode configured to receive the data voltages, and a second electrode connected to the second pixel node;

a third pixel transistor including a control electrode configured to receive a compensation gate signal, a first electrode connected to the third pixel node, and a second electrode connected to the first pixel node;

a fourth pixel transistor including a control electrode configured to receive an initialization gate signal, a first electrode configured to receive a first initialization voltage, and a second electrode connected to the first pixel node;

a fifth pixel transistor including a control electrode configured to receive an emission signal, a first electrode configured to receive a first power voltage, and a second electrode connected to the second pixel node;

a sixth pixel transistor including a control electrode configured to receive the emission signal, a first electrode connected to the third pixel node, and a second electrode connected to a fourth pixel node;

a seventh pixel transistor including a control electrode configured to receive the bias gate signal, a first electrode configured to receive a second initialization voltage, and a second electrode connected to the fourth pixel node;

a storage capacitor including a first electrode configured to receive the first power voltage and a second electrode connected to the first pixel node; and the light emitting element including a first electrode connected to the fourth pixel node and a second electrode configured to receive a second power voltage.

7. The gate driver of claim 1, wherein the first stage includes:

a 1-1th stage transistor including a control electrode configured to receive the first clock signal, a first electrode configured to receive a first input signal, and a second electrode connected to a 1-1th stage node;

a 1-2th stage transistor including a control electrode connected to a 1-2th stage node, a first electrode configured to receive a high voltage, and a second electrode connected to a 1-3th stage node;

a 1-3th stage transistor including a control electrode connected to a 1-4th stage node, a first electrode configured to receive the second clock signal, and a second electrode connected to the 1-3th stage node;

a 1-4th stage transistor including a control electrode connected to the 1-1th stage node, a first electrode configured to receive the first clock signal, and a second electrode connected to the 1-2th stage node;

a 1-5th stage transistor including a control electrode configured to receive the first clock signal, a first electrode configured to receive a low voltage, and a second electrode connected to the 1-2th stage node;

a 1-6th stage transistor including a control electrode configured to receive the second clock signal, a first electrode connected to a 1-5th stage node, and a second electrode connected to a 1-6th stage node;

a 1-7th stage transistor including a control electrode connected to a 1-7th stage node, a first electrode configured to receive the second clock signal, and a second electrode connected to the 1-5th stage node;

a 1-8th stage transistor including a control electrode connected to the 1-1th stage node, a first electrode configured to receive the high voltage, and a second electrode connected to the 1-6th stage node;

a 1-9th stage transistor including a control electrode connected to the 1-6th stage node, a first electrode configured to receive the high voltage, and a second electrode connected to an output terminal of the first stage;

a 1-10th stage transistor including a control electrode connected to the 1-4th stage node, a first electrode configured to receive the low voltage, and a second electrode connected to the output terminal of the first stage;

a 1-11th stage transistor including a control electrode configured to receive the low voltage, a first electrode connected to the 1-2th stage node, and a second electrode connected to the 1-7th stage node;

a 1-12th stage transistor including a control electrode configured to receive the low voltage, a first electrode connected to the 1-1th stage node, and a second electrode connected to the 1-4th stage node;

a 1-1th stage capacitor including a first electrode configured to receive the high voltage and a second electrode connected to the 1-6th stage node;

a 1-2th stage capacitor including a first electrode connected to the 1-7th stage node and a second electrode connected to the 1-5th stage node; and a 1-3th stage capacitor including a first electrode connected to the 1-4th stage node and a second electrode connected to the 1-3th stage node.

8. The gate driver of claim 7, wherein the first stage outputting a first bias gate signal in one frame is configured to receive the inverted start signal as the first input signal.

9. The gate driver of claim 1, wherein the second stage includes:

a 2-1th stage transistor including a control electrode configured to receive a third clock signal, a first electrode configured to receive a second input signal, and a second electrode connected to a 2-1th stage node;

a 2-2th stage transistor including a control electrode connected to a 2-2th stage node, a first electrode configured to receive a high voltage, and a second electrode connected to a first electrode of a 2-3th stage transistor;

the 2-3th stage transistor including a control electrode configured to receive a fourth clock signal, the first electrode connected to the second electrode of the 2-2th stage transistor, and a second electrode connected to the 2-1th stage node;

a 2-4th stage transistor including a control electrode connected to the 2-1th stage node, a first electrode configured to receive the third clock signal, and a second electrode connected to the 2-2th stage node;

a 2-5th stage transistor including a control electrode configured to receive the third clock signal, a first electrode configured to receive a low voltage, and a second electrode connected to the 2-2th stage node;

a 2-6th stage transistor including a control electrode connected to the 2-2th stage node, a first electrode configured to receive the high voltage, and a second electrode connected to an output terminal of the second stage;

a 2-7th stage transistor including a control electrode connected to a 2-3th stage node, a first electrode configured to receive the fourth clock signal, and a second electrode connected to the output terminal of the second stage;

a 2-8th stage transistor including a control electrode configured to receive the low voltage, a first electrode connected to the 2-1th stage node, and a second electrode connected to the 2-3th stage node;

a 2-1th stage capacitor including a first electrode configured to receive the high voltage and a second electrode connected to the 2-2th stage node; and a 2-2th stage capacitor including a first electrode connected to the 2-3th stage node and a second electrode connected to the output terminal of the second stage.

10. The gate driver of claim 9, wherein the second stage outputting a first write gate signal in one frame is configured to receive the start signal as the second input signal.

11. The gate driver of claim 1, wherein the inverter includes:

a first inverter transistor including a control electrode configured to receive the start signal, a first electrode configured to receive the first clock signal, and a second electrode connected to a first inverter node;

a second inverter transistor including a control electrode configured to receive the first clock signal, a first electrode configured to receive a low voltage, and a second electrode connected to the first inverter node;

a third inverter transistor including a control electrode configured to receive the second clock signal, a first electrode connected to a second inverter node, and a second electrode connected to an output terminal of the inverter;

a fourth inverter transistor including a control electrode connected to a third inverter node, a first electrode configured to receive the second clock signal, and a second electrode connected to the second inverter node;

a fifth inverter transistor including a control electrode configured to receive the start signal, a first electrode configured to receive a high voltage, and a second electrode connected to the output terminal of the inverter;

a sixth inverter transistor including a control electrode configured to receive the low voltage, a first electrode connected to the first inverter node, and a second electrode connected to the third inverter node;

a first inverter capacitor including a first electrode configured to receive the high voltage and a second electrode connected to the output terminal of the inverter; and a second inverter capacitor including a first electrode connected to the third inverter node and a second electrode connected to the second inverter node.

12. A display device comprising:

a display panel including pixels;

a data driver configured to apply data voltages to the pixels;

a gate driver configured to apply a bias gate signal to each of the pixels to initialize a light emitting element of each of the pixels and a write gate signal to each of the pixels to apply the data voltages to the pixels; and a timing controller configured to control the data driver and the gate driver, wherein the gate driver includes:

an inverter configured to invert a start signal to generate an inverted start signal;

a first driver including a first stage configured to generate the bias gate signal in response to the inverted start signal; and a second driver including a second stage configured to generate the write gate signal in response to the start signal, and wherein the first driver further receives a first clock signal and a second clock signal to generate the bias gate signal.

13. The display device of claim 12, wherein the write gate signal has an activation period in a display scan period in which the data voltages are written to a storage capacitor of each of the pixels and in a self-scan period in which the data voltages are not written to the storage capacitor of each of the pixels.

14. The display device of claim 12, wherein the bias gate signal has an activation period in a display scan period in which the data voltages are written to a storage capacitor of each of the pixels and in a self-scan period in which the data voltages are not written to the storage capacitor of each of the pixels.

15. The display device of claim 12, wherein the inverter is configured to receive the first clock signal and the second clock signal to generate the inverted start signal.

16. The display device of claim 15, wherein the second stage is configured to receive a third clock signal and a fourth clock signal to generate the write gate signal.

17. The display device of claim 12, wherein each of the pixels includes:

a first pixel transistor including a control electrode connected to a first pixel node, a first electrode connected to a second pixel node, and a second electrode connected to a third pixel node;

a second pixel transistor including a control electrode configured to receive the write gate signal, a first electrode configured to receive the data voltages, and a second electrode connected to the second pixel node;

a third pixel transistor including a control electrode configured to receive a compensation gate signal, a first electrode connected to the third pixel node, and a second electrode connected to the first pixel node;

a fourth pixel transistor including a control electrode configured to receive an initialization gate signal, a first electrode configured to receive a first initialization voltage, and a second electrode connected to the first pixel node;

a fifth pixel transistor including a control electrode configured to receive an emission signal, a first electrode configured to receive a first power voltage, and a second electrode connected to the second pixel node;

a sixth pixel transistor including a control electrode configured to receive the emission signal, a first electrode connected to the third pixel node, and a second electrode connected to a fourth pixel node;

a seventh pixel transistor including a control electrode configured to receive the bias gate signal, a first electrode configured to receive a second initialization voltage, and a second electrode connected to the fourth pixel node;

a storage capacitor including a first electrode configured to receive the first power voltage and a second electrode connected to the first pixel node; and the light emitting element including a first electrode connected to the fourth pixel node and a second electrode configured to receive a second power voltage.

18. The display device of claim 12, wherein the first stage includes:

a 1-1th stage transistor including a control electrode configured to receive the first clock signal, a first electrode configured to receive a first input signal, and a second electrode connected to a 1-1th stage node;

a 1-2th stage transistor including a control electrode connected to a 1-2th stage node, a first electrode configured to receive a high voltage, and a second electrode connected to a 1-3th stage node;

a 1-3th stage transistor including a control electrode connected to a 1-4th stage node, a first electrode configured to receive the second clock signal, and a second electrode connected to the 1-3th stage node;

a 1-4th stage transistor including a control electrode connected to the 1-1th stage node, a first electrode configured to receive the first clock signal, and a second electrode connected to the 1-2th stage node;

a 1-5th stage transistor including a control electrode configured to receive the first clock signal, a first electrode configured to receive a low voltage, and a second electrode connected to the 1-2th stage node;

a 1-6th stage transistor including a control electrode configured to receive the second clock signal, a first electrode connected to a 1-5th stage node, and a second electrode connected to a 1-6th stage node;

a 1-7th stage transistor including a control electrode connected to a 1-7th stage node, a first electrode configured to receive the second clock signal, and a second electrode connected to the 1-5th stage node;

a 1-8th stage transistor including a control electrode connected to the 1-1th stage node, a first electrode configured to receive the high voltage, and a second electrode connected to the 1-6th stage node;

a 1-9th stage transistor including a control electrode connected to the 1-6th stage node, a first electrode configured to receive the high voltage, and a second electrode connected to an output terminal of the first stage;

a stage 1-10th transistor including a control electrode connected to the stage 1-4th node, a first electrode configured to receive the low voltage, and a second electrode connected to the output terminal of the first stage;

a 1-11th stage transistor including a control electrode configured to receive the low voltage, a first electrode connected to the 1-2th stage node, and a second electrode connected to the 1-7th stage node;

a 1-12th stage transistor including a control electrode configured to receive the low voltage, a first electrode connected to the 1-1th stage node, and a second electrode connected to the 1-4th stage node;

a 1-1th stage capacitor including a first electrode configured to receive the high voltage and a second electrode connected to the 1-6th stage node;

a 1-2th stage capacitor including a first electrode connected to the 1-7th stage node and a second electrode connected to the 1-5th stage node; and a 1-3th stage capacitor including a first electrode connected to the 1-4th stage node and a second electrode connected to the 1-3th stage node.

19. The display device of claim 12, wherein the second stage includes:

a 2-1th stage transistor including a control electrode configured to receive a third clock signal, a first electrode configured to receive a second input signal, and a second electrode connected to a 2-1th stage node;

a 2-2th stage transistor including a control electrode connected to a 2-2th stage node, a first electrode configured to receive a high voltage, and a second electrode connected to a first electrode of a 2-3th stage transistor;

the 2-3th stage transistor including a control electrode configured to receive a fourth clock signal, the first electrode connected to the second electrode of the 2-2th stage transistor, and a second electrode connected to the 2-1th stage node;

a 2-4th stage transistor including a control electrode connected to the 2-1th stage node, a first electrode configured to receive the third clock signal, and a second electrode connected to the 2-2th stage node;

a 2-5th stage transistor including a control electrode configured to receive the third clock signal, a first electrode configured to receive a low voltage, and a second electrode connected to the 2-2th stage node;

a 2-6th stage transistor including a control electrode connected to the 2-2th stage node, a first electrode configured to receive the high voltage, and a second electrode connected to an output terminal of the second stage;

a 2-7th stage transistor including a control electrode connected to a 2-3th stage node, a first electrode configured to receive the fourth clock signal, and a second electrode connected to the output terminal of the second stage;

a 2-8th stage transistor including a control electrode configured to receive the low voltage, a first electrode connected to the 2-1 stage node, and a second electrode connected to the 2-3th stage node;

a 2-1th stage capacitor including a first electrode configured to receive the high voltage and a second electrode connected to the 2-2th stage node; and a 2-2th stage capacitor including a first electrode connected to the 2-3th stage node and a second electrode connected to the output terminal of the second stage.

20. The display device of claim 12, wherein the inverter includes:

a first inverter transistor including a control electrode configured to receive the start signal, a first electrode configured to receive the first clock signal, and a second electrode connected to a first inverter node;

a second inverter transistor including a control electrode configured to receive the first clock signal, a first electrode configured to receive a low voltage, and a second electrode connected to the first inverter node;

a third inverter transistor including a control electrode configured to receive the second clock signal, a first electrode connected to a second inverter node, and a second electrode connected to an output terminal of the inverter;

a fourth inverter transistor including a control electrode connected to a third inverter node, a first electrode configured to receive the second clock signal, and a second electrode connected to the second inverter node;

a fifth inverter transistor including a control electrode configured to receive the start signal, a first electrode configured to receive a high voltage, and a second electrode connected to the output terminal of the inverter;

a first inverter capacitor including a first electrode configured to receive the high voltage and a second electrode connected to the output terminal of the inverter;

a sixth inverter transistor including a control electrode configured to receive the low voltage, a first electrode connected to the first inverter node, and a second electrode connected to the third inverter node; and a second inverter capacitor including a first electrode connected to the third inverter node and a second electrode connected to the second inverter node.

* * * * *